US009627802B2

(12) United States Patent
Warren

(10) Patent No.: US 9,627,802 B2
(45) Date of Patent: *Apr. 18, 2017

(54) ELECTRICAL CHARGING DEVICES AND ASSEMBLIES

(71) Applicant: William J. Warren, Frisco, TX (US)

(72) Inventor: William J. Warren, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,402

(22) Filed: Jan. 27, 2016

(65) Prior Publication Data

US 2016/0141815 A1    May 19, 2016

Related U.S. Application Data

(63) Continuation-in-part of application No. 14/634,568, filed on Feb. 27, 2015.

(Continued)

(51) Int. Cl.
*H01R 13/60* (2006.01)
*H01R 13/44* (2006.01)
(Continued)

(52) U.S. Cl.
CPC ............. *H01R 13/60* (2013.01); *H01R 13/44* (2013.01); *H01R 31/065* (2013.01);
(Continued)

(58) Field of Classification Search
CPC .... H01R 12/7058; H01R 13/60; H01R 13/62; H01R 13/6453; H01R 13/6675; H01R 24/68; H01R 29/00; H01R 31/065; H01R 25/006; H01R 13/44; H01R 31/06; H04M 1/04; H02J 7/0042
(Continued)

(56) References Cited

U.S. PATENT DOCUMENTS 5,305,381 A    4/1994 Wang et al.
5,648,712 A    7/1997 Hahn
(Continued)

FOREIGN PATENT DOCUMENTS

EP    2228263 A1    9/2010
WO    WO2016003585 A1    1/2016

OTHER PUBLICATIONS

International Search Report and Written Opinion mailed Sep. 4, 2015 for Patent Cooperation Treaty Application PCT/US2015/034073, filed Jun. 3, 2015.

*Primary Examiner* — Tulsidas C Patel
*Assistant Examiner* — Travis Chambers
(74) *Attorney, Agent, or Firm* — Carr & Ferrell LLP

(57) ABSTRACT

Electrical charging devices and assemblies are provided herein. An example device includes a housing tray having a sidewall extending perpendicularly from the housing tray, the housing tray being configured to hold a personal electronic device, the housing tray including an electrical connector interface that couples with a charging connector of the personal electronic device. Also, the device includes an electrical connector for electrically coupling with a DC source, the electrical connector capable of being placed in either a deployed configuration where the electrical connector can couple with the DC source or a stored configuration where the electrical connector cannot couple with the DC source.

18 Claims, 37 Drawing Sheets

Related U.S. Application Data

(60) Provisional application No. 61/998,497, filed on Jun. 29, 2014, provisional application No. 61/998,646, filed on Jul. 2, 2014, provisional application No. 61/998,649, filed on Jul. 3, 2014, provisional application No. 61/998,770, filed on Jul. 6, 2014, provisional application No. 62/124,684, filed on Dec. 29, 2014, provisional application No. 62/179,669, filed on May 14, 2015, provisional application No. 62/231,762, filed on Jul. 14, 2015.

(51) Int. Cl.
 *H01R 31/06*    (2006.01)
 *H01R 13/66*    (2006.01)
 *H01R 24/68*    (2011.01)
 *H04M 1/04*    (2006.01)

(52) U.S. Cl.
 CPC .......... *H01R 13/6675* (2013.01); *H01R 24/68* (2013.01); *H04M 1/04* (2013.01)

(58) Field of Classification Search
 USPC ....... 439/529, 172, 174, 528, 533, 534, 571, 439/576, 131, 536, 652, 929; 320/111, 320/115; 174/66
 See application file for complete search history.

(56) References Cited

U.S. PATENT DOCUMENTS

| | | | |
|---|---|---|---|
| 5,679,017 A | 10/1997 | Smith | |
| 5,762,512 A | 6/1998 | Trant et al. | |
| 6,091,611 A | 7/2000 | Lanni | |
| 6,510,067 B1 | 1/2003 | Toebes | |
| 6,831,848 B2 | 12/2004 | Lanni | |
| 6,848,802 B2* | 2/2005 | Chen | G06F 1/1601 362/191 |
| 6,861,822 B2 | 3/2005 | Wei | |
| 7,066,767 B2* | 6/2006 | Liao | H01R 27/02 439/13 |
| 7,166,987 B2 | 1/2007 | Lee et al. | |
| 7,254,424 B1 | 8/2007 | Reichert | |
| 7,524,197 B2* | 4/2009 | Mills | G06F 1/1632 381/334 |
| 7,528,323 B2* | 5/2009 | Wu | H01R 13/72 174/66 |
| 7,540,748 B2* | 6/2009 | Tracy | G06F 1/1616 439/131 |
| 7,623,182 B2* | 11/2009 | Byrne | H04N 1/00127 348/373 |
| 7,682,185 B2 | 3/2010 | Liao | |
| 7,699,664 B2* | 4/2010 | Kim | H01R 24/58 381/374 |
| 7,850,484 B2 | 12/2010 | Hayashi et al. | |
| 7,857,659 B2* | 12/2010 | Wang | G06F 1/16 439/501 |
| 8,113,873 B1* | 2/2012 | Sarraf | H01R 13/6315 439/533 |
| 8,415,920 B2 | 4/2013 | Liao | |
| 8,686,683 B2 | 4/2014 | Caskey et al. | |
| 8,794,997 B2* | 8/2014 | Tin | H02J 1/00 439/535 |
| 9,130,332 B2* | 9/2015 | Yosef | H01R 31/06 |
| 2003/0218445 A1 | 11/2003 | Behar | |
| 2005/0178633 A1* | 8/2005 | Liao | H02G 11/02 191/12.4 |
| 2006/0194467 A1* | 8/2006 | Beasley | H01R 13/6641 439/339 |
| 2007/0258204 A1* | 11/2007 | Chang | G06F 1/1616 361/679.4 |
| 2008/0157715 A1 | 7/2008 | Rosenboom et al. | |
| 2008/0227380 A1* | 9/2008 | Hsu | G11B 33/025 454/184 |
| 2009/0047827 A1* | 2/2009 | Liao | H01R 13/60 439/501 |
| 2012/0049800 A1 | 3/2012 | Johnson et al. | |
| 2012/0077361 A1 | 3/2012 | Youssefi-Shams et al. | |
| 2012/0178506 A1* | 7/2012 | Sorias | H02J 7/0042 455/573 |
| 2012/0214348 A1* | 8/2012 | Youssefi-Shams | H01R 13/44 439/638 |
| 2013/0150134 A1* | 6/2013 | Pliner | H02J 7/0042 455/573 |
| 2013/0178252 A1* | 7/2013 | Sorias | H02J 7/0042 455/573 |
| 2014/0030912 A1* | 1/2014 | Cohen | H01R 13/73 439/529 |
| 2015/0207286 A1* | 7/2015 | Chen | H04M 1/04 439/639 |
| 2015/0263447 A1* | 9/2015 | Liao | H01R 31/065 361/601 |
| 2015/0380872 A1 | 12/2015 | Warren | |
| 2016/0087381 A1* | 3/2016 | Wong | H01R 27/02 439/529 |
| 2016/0118758 A1* | 4/2016 | Cymerman | H01R 31/06 439/39 |
| 2016/0204816 A1* | 7/2016 | Abramovich | H04B 1/3888 455/575.8 |
| 2016/0218536 A1* | 7/2016 | Caren | H02J 7/0045 |
| 2016/0261129 A1 | 9/2016 | Warren | |

\* cited by examiner

ELECTRICAL CHARGING DEVICES AND ASSEMBLIES

CROSS REFERENCE TO RELATED APPLICATIONS

The present application is a Continuation-in-Part of U.S. patent application Ser. No. 14/634,568, filed on Feb. 27, 2015, which claims the benefit of U.S. Provisional Application No. 61/998,497, filed on Jun. 29, 2014; U.S. Provisional Application No. 61/998,646, filed on Jul. 2, 2014; U.S. Provisional Application No. 61/998,649, filed on Jul. 3, 2014; U.S. Provisional Application No. 61/998,770, filed on Jul. 6, 2014; and U.S. Provisional Application No. 62/124,684, filed on Dec. 29, 2014; this application also claims the benefit of U.S. Provisional Application No. 62/179,669, filed on May 14, 2015, and of U.S. Provisional Application No. 62/231,762, filed on Jul. 14, 2015. All of the above applications are hereby incorporated by reference herein in their entireties including all references cited therein.

FIELD

The present technology pertains to devices for electronic charging, and more specifically, but not by way of limitation, to electronic charging devices that couple with a charging port (such as USB) and include a tray that receives an electronic device such as a Smartphone, tablet, laptop, and so forth. Some embodiments comprise mechanisms for transitioning a DC connector (USB connector) between a deployed configuration to a storage configuration and vice versa.

SUMMARY

According to some embodiments, the present technology is directed to a device, comprising: (a) a housing tray having a sidewall extending perpendicularly from the housing tray, the housing tray being configured to hold a personal electronic device, the housing tray comprising an electrical connector interface that couples with a charging connector of the personal electronic device; (b) a circuit mounted on the housing tray for converting alternating current received from an electrical outlet to direct current that charges the personal electronic device through the electrical connector interface; and (c) an electrical connector for electrically coupling the circuit with the electrical outlet, the electrical connector capable of being placed in either a deployed configuration where the electrical connector can couple with the electrical outlet or a stored configuration where the electrical connector cannot couple with the electrical outlet.

According to some embodiments, the present technology is directed to a device, comprising: (a) a first housing tray comprising a sidewall extending perpendicularly from the housing tray, the housing tray being configured to hold a personal electronic device, the first housing tray further comprising a circuit for converting alternating current at 110 volts received from an electrical outlet to direct current that can be used to charge the personal electronic device; (b) a second housing tray comprising an electrical connector for electrically coupling the circuit with the electrical outlet, the electrical connector capable of being placed in either a deployed configuration or a stored configuration; and (c) a third housing tray that comprises a stabilizer, the stabilizer contacting the electrical outlet or a wall of the electrical outlet to support a weight of the personal electronic device.

According to some embodiments, the present technology is directed to a device, comprising: (a) a first housing tray comprising a sidewall extending perpendicularly from the housing tray, the housing tray being configured to hold a personal electronic device, the first housing tray further comprising an electrical connector interface that couples with a charging connector of the personal electronic device; (b) a second housing tray comprising: (i) a circuit for converting alternating current at 110 volts received from an electrical outlet to direct current that can be used to charge the personal electronic device using the electrical connector interface; and (ii) an electrical connector for electrically coupling the circuit with the electrical outlet, the electrical connector capable of being placed in either a deployed configuration or a stored configuration based on pivoting movement of a third housing tray relative to the second housing tray; and (c) the third housing tray that comprises a stabilizer, the stabilizer contacting the electrical outlet or a wall of the electrical outlet to support a weight of the personal electronic device.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
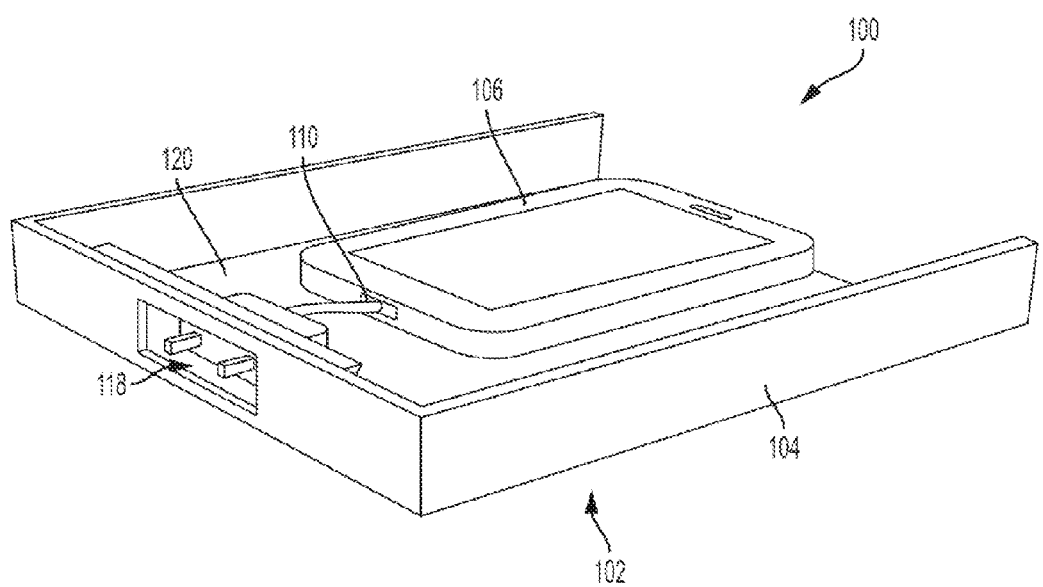
FIG. 1 is a perspective view of an example device of the present technology.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port.

Some embodiments include a single housing tray that is provided with an electrical plug that is configured to fit in an electrical wall outlet. The electrical plug can be configured to transition between a deployed configuration and a stored configuration. In the deployed configuration, prongs of the electrical plug extend such that they can be inserted into the outlet. In the stored configuration, the prongs of the electrical plug are retracted or folded into the tray.

When plugged into the outlet, the housing tray is a cantilever that supports the weight of the electronic device that is being charged by the device. The housing tray comprises a circuit for transforming the AC power received from the outlet to DC power that can be used to recharge the electronic device.

In some embodiments, the housing tray can comprise a stabilizer that contacts the outlet or the wall and at least partially bears the weight of the electronic device.

In other embodiments, the device includes additional housing trays that are disposed in a stacked configuration. Movement of these housing trays relative to one another function to move the electrical plug between its deployed and stored configurations. Also, stabilizers can be stored in one or more of these additional trays. In some embodiments, one or more of the additional trays is pivotally hinged to an adjacent housing tray.

Turning now to FIGS. 1-8, which collectively illustrates an example device 100, constructed in accordance with the present technology.

The device 100 includes a housing tray 102 having a sidewall 104 extending perpendicularly from the housing tray 102. The housing tray 102 is configured to hold a personal electronic device 106.

Figure 2:
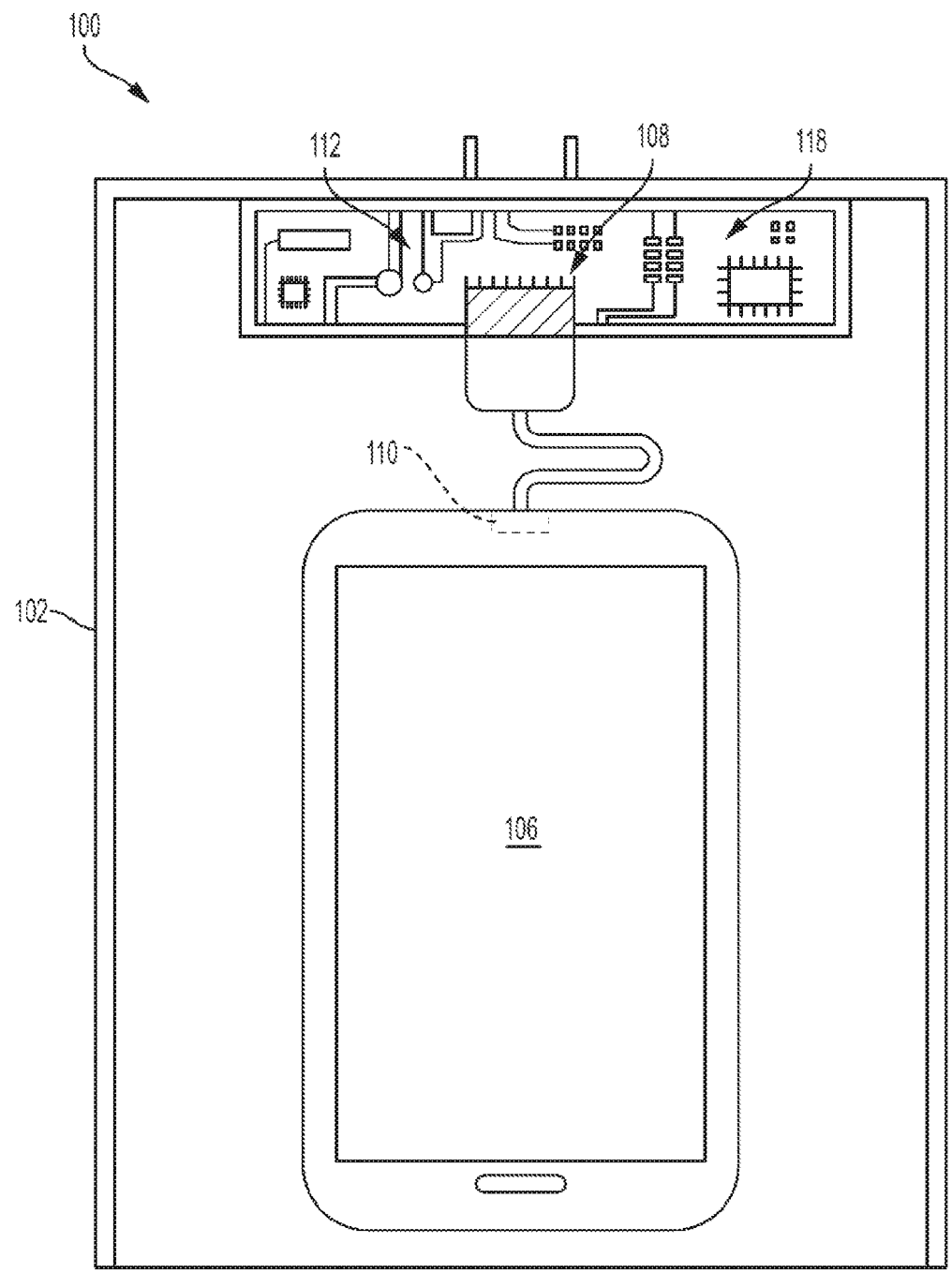
FIG. 2 is a top down view of the device of FIG. 1.

The housing tray 102 comprises an electrical connector interface 108 that couples with a charging connector 110 of the personal electronic device 106, as illustrated in FIG. 2. The device 100 also includes a circuit 112 mounted on the housing tray 102 for converting alternating current received from an electrical outlet 114 of a wall 116 (see FIG. 3) to direct current that charges the personal electronic device 106 through the electrical connector interface 108.

In some embodiments, the device 100 includes an electrical connector 118 for electrically coupling the circuit 112 with the electrical outlet 114. The electrical connector 118 is capable of being placed in either a deployed configuration (see FIG. 3) where the electrical connector 118 can couple with the electrical outlet 114 or a stored configuration (see FIG. 1) where the electrical connector 118 cannot couple with the electrical outlet 114.

In more detail, the housing tray 102 includes a plate 120. The plate 120 supports the circuit 112 and the personal electronic device 106. The sidewall 104 extends around at least a portion of a periphery of the plate 120. In one example, the sidewall 104 extends around one or more sides, and in some embodiments four sides of the plate 120.

According to some embodiments, the circuit 112 can comprise a printed circuit board with various permutations of electrical components. In general, the circuit 112 is configured to transform the AC power waveform received from the outlet 114 into DC power that is appropriate for charging the personal electronic device 106.

In some embodiments, the circuit 112 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

Figure 5:
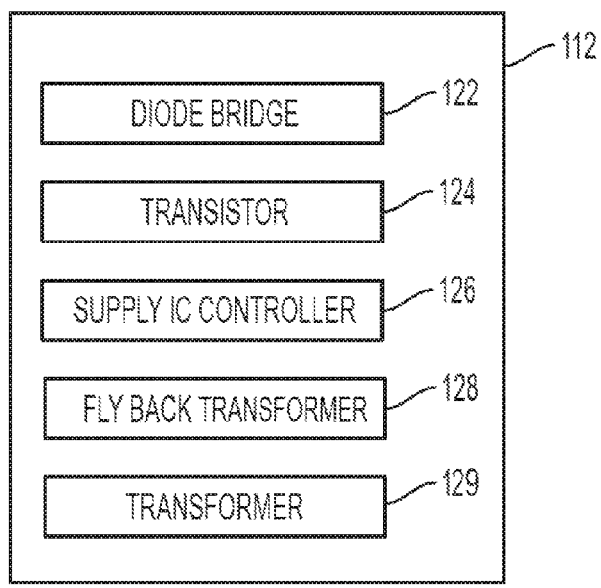
FIG. 5 is a schematic diagram of an example circuit for use in the example devices of the present technology.

In some embodiments, such as in FIG. 5, the circuit 112 is an advanced flyback switching power supply that receives the AC voltage in ranges of 100 to 240 volts, and produces approximately five watts of smooth voltage power. AC line power is converted to high voltage DC current using a diode bridge 122. The DC power is switched off and on by a transistor 124 controlled by a power supply IC controller 126.

In other embodiments, the chopped DC power supply is fed back into a flyback transformer 128, which converts the DC power to a low voltage AC waveform. The AC waveform is then converted into DC, which is filtered with a filter 132 to obtain smooth power that is substantially free of interference. This smoothed power is provided to a USB port (e.g., electrical connector interface 108). The circuit 112 can comprise a feedback circuit 133 that measures the voltage output to the electrical connector interface 108 and sends a signal to the power supply IC controller 126, which adjusts the switching frequency to obtain a desired voltage.

While the use of USB port is contemplated, the electrical connector interface 108 can be selectively changed depending upon the type electrical device that needs to be charged. Other examples include power over Ethernet, firewire, MIDI, Thunderbolt, and so forth.

Figure 6:
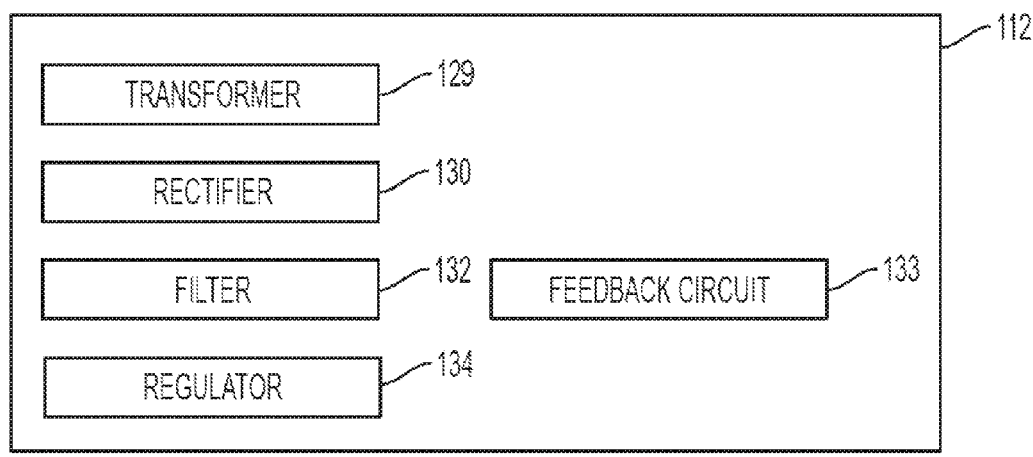
FIG. 6 is a schematic diagram of another example circuit for use in the example devices of the present technology.

In another example circuit, illustrated in FIG. 6, the circuit 112 comprises a transformer 129 that performs a step down of the AC voltage received from the outlet 114 to a working output voltage. A rectifier 130 then converts the stepped down voltage from AC to DC. In some embodiments, the rectifier 130 is a full wave bridge rectifier. At filter 132, a capacitor may be used to smooth the DC voltage. A regulator 134 can also be employed to even further smooth the DC current. For example, a zener diode or IC voltage regulator can be utilized.

The circuits of FIGS. 5 and 6 are merely example circuits that can be used to transform the AC power received at a wall outlet to a DC power feed that can be used to charge an electronic device without causing any damage to the circuitry of the electronic device.

Figure 7:
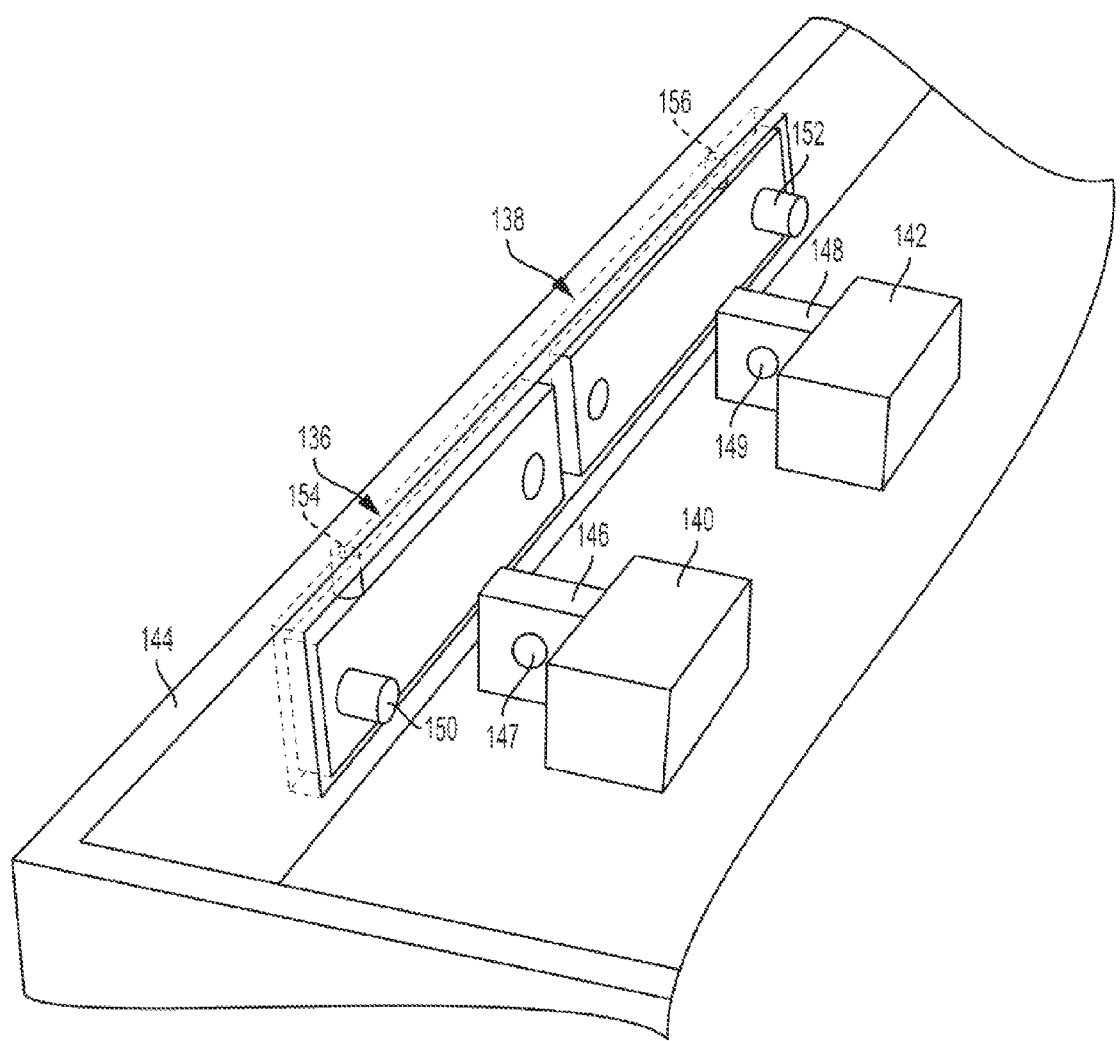
FIG. 7 is a partial view of a pair of pivoting prongs and pair of electrical posts.
Figure 8:
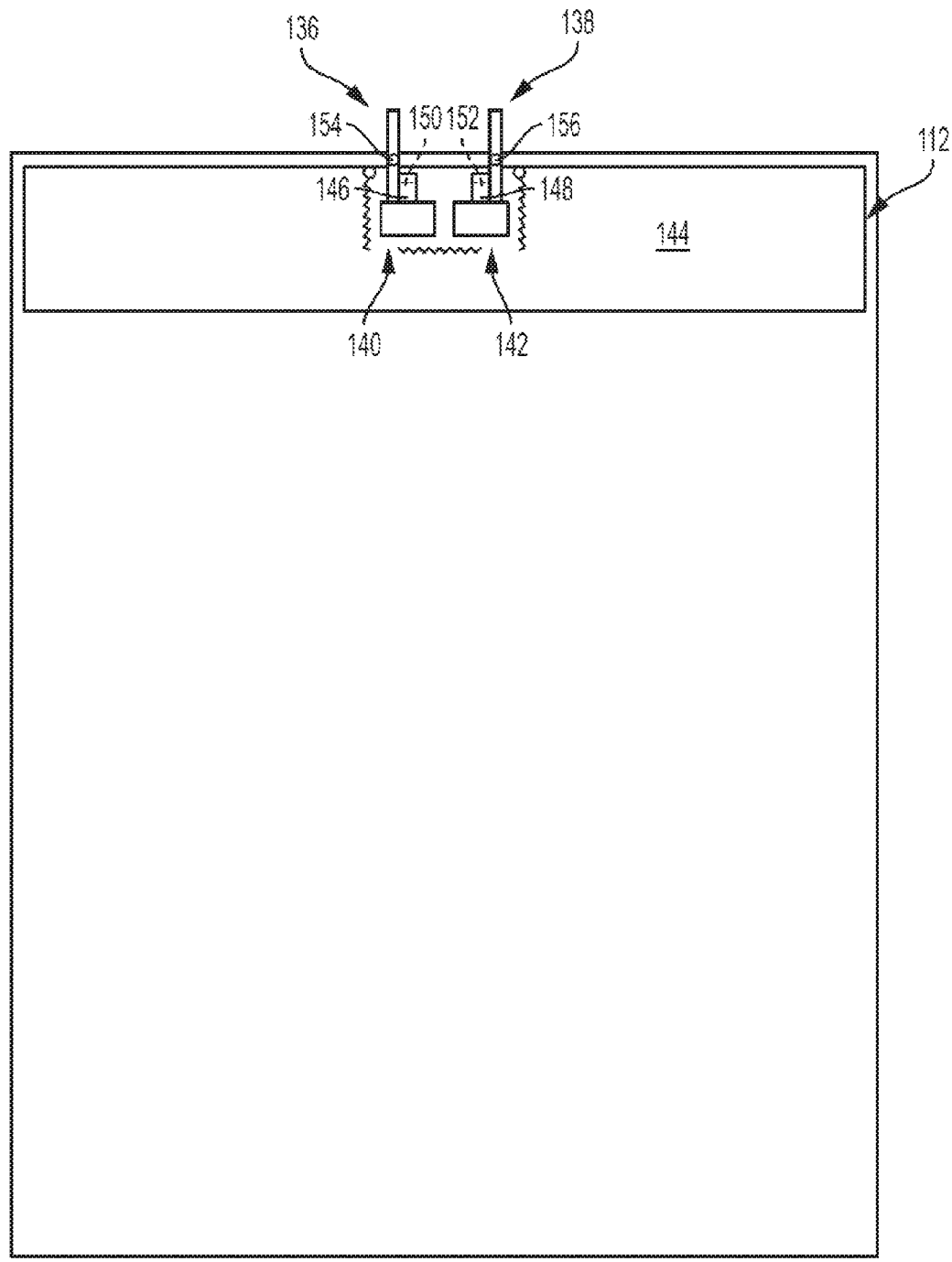
FIG. 8 is a cutaway view of the pair of pivoting prongs and pair of electrical posts in a deployed configuration.
Figure 9:
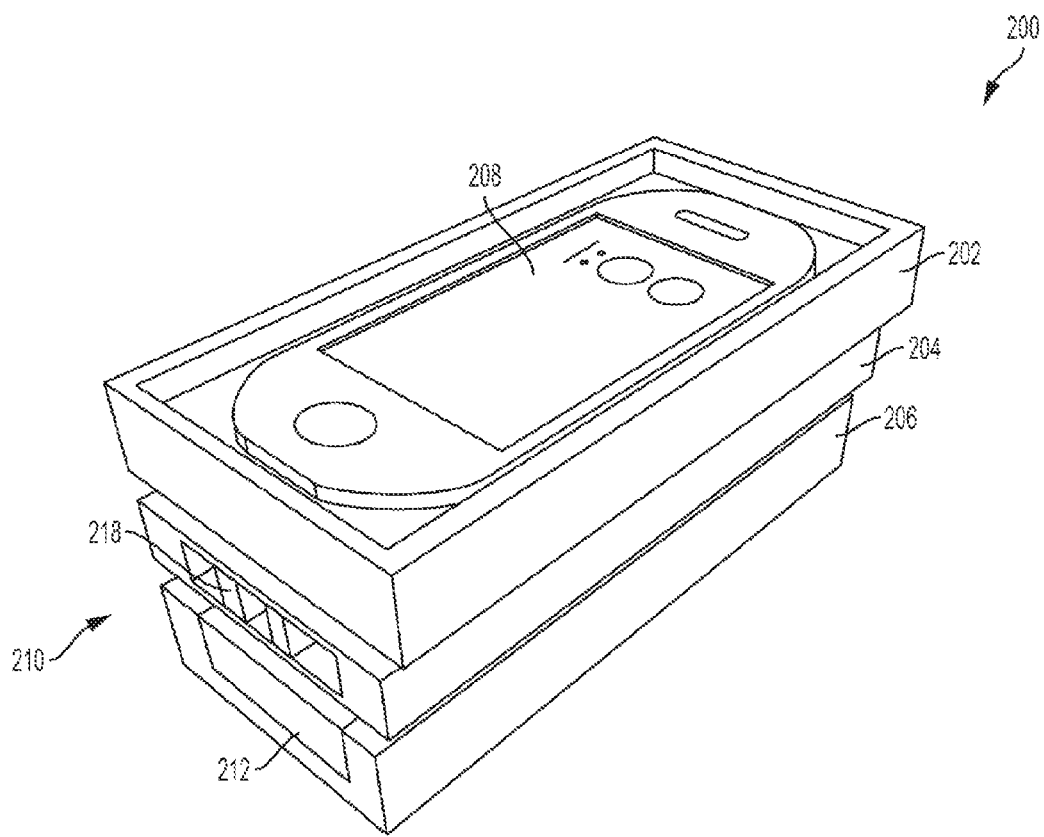
FIG. 9 is a perspective view of another example device of the present technology.

Turning now to FIGS. 7-8, the electrical connector interface 108 comprises a pair of pivoting prongs 136 and 138 that are designed to move into and out of contact with a pair of electrical posts 140 and 142 of the circuit 112 and provide power to the circuit (when the device is plugged into the outlet).

The prongs 136 and 138 move into contact with the posts 140 and 142, respectively, when the electrical connector is moved into the deployed configuration. Likewise, the prongs 136 and 138 move out of contact with the posts 140 and 142, respectively, when the electrical connector is moved into the stored configuration.

Figure 3:
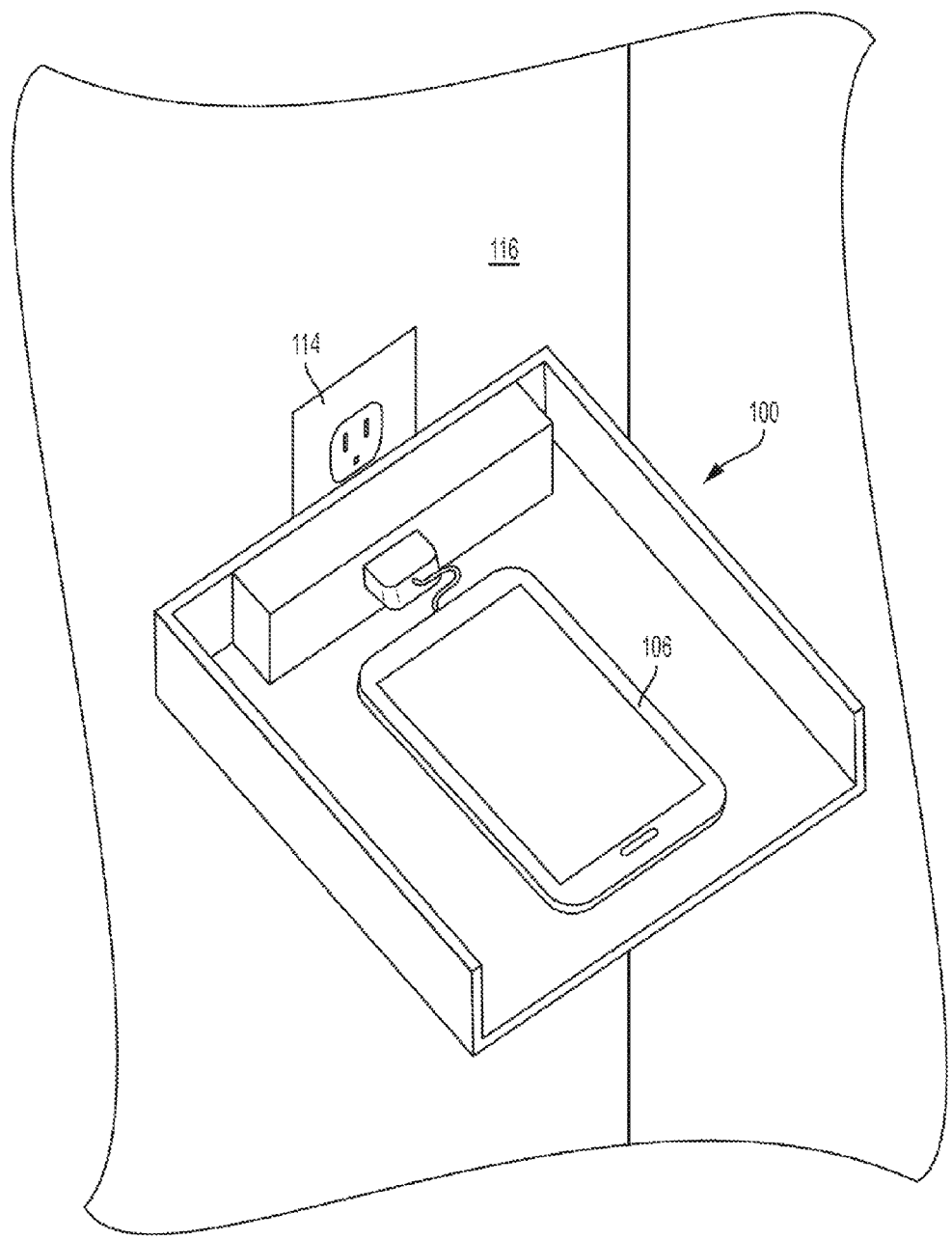
FIG. 3 is a perspective view of the device of FIG. 1, installed into an outlet of a wall.
Figure 4:
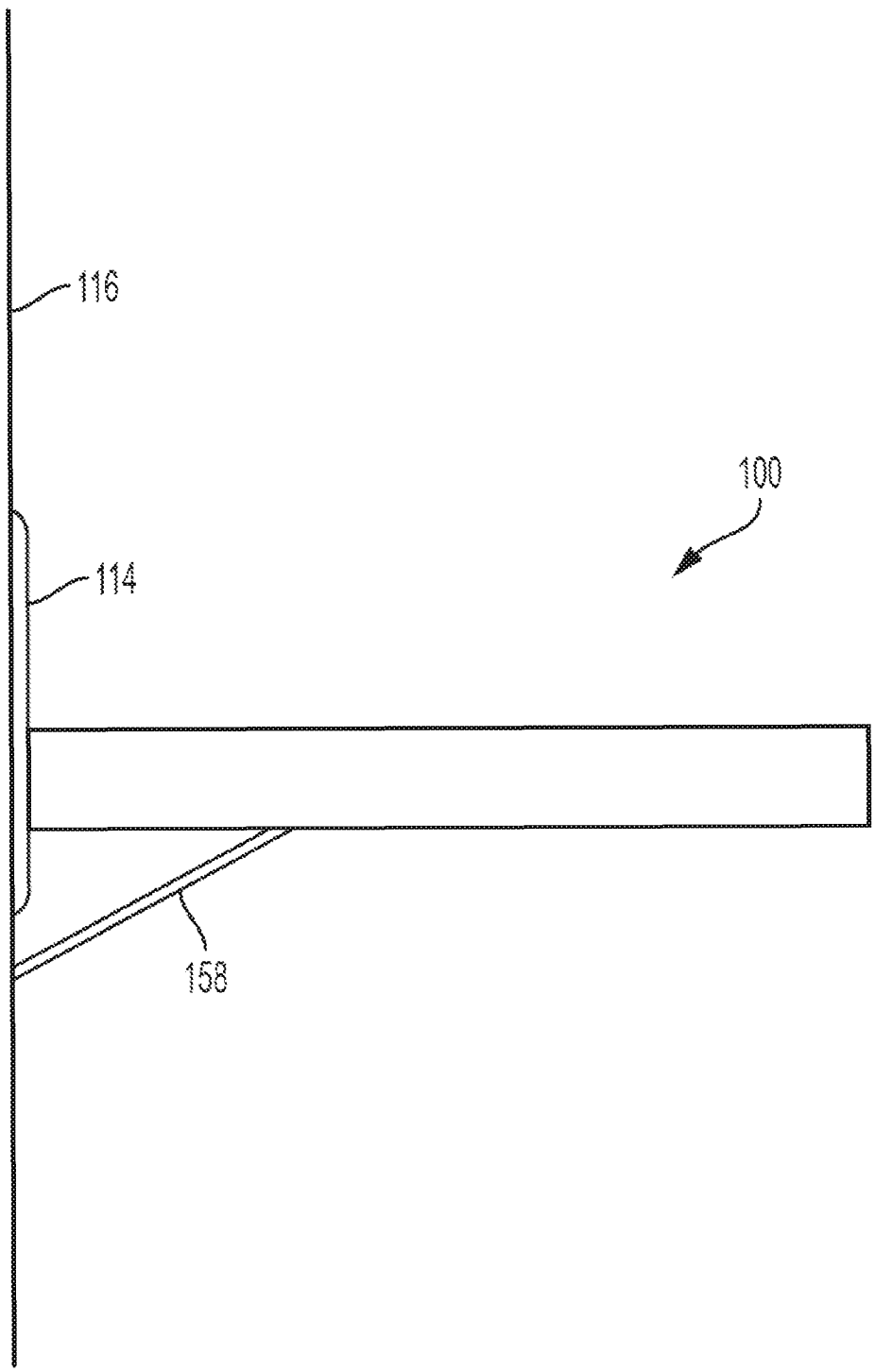
FIG. 4 is a side view of the device of FIG. 1, installed into an outlet of a wall.

The prongs 136 and 138, when stored, lie flat with the front of an enclosure 144 that covers the circuit 112, as illustrated in FIG. 1. The prongs 136 and 138 will extend away from the enclosure 144 when in the deployed configuration, as illustrated in FIG. 3.

In some embodiments, each of the pair of electrical posts 140 and 142 comprises a post interface 146 and 148 (respectively). Each of the pair of pivoting prongs 136 and 138 include a prong interface 150 and 152 (respectively) that electrically couple when the electrical connector is in the deployed configuration.

In one embodiment, the post interfaces 146 and 148 include apertures 147 and 149, respectively, and the prong interfaces 150 and 152 are pegs/protrusions that are each sized to matingly fit within an aperture. The mating fit should be sufficient to provide an electrical connection between the prongs 136 and 138 and the posts 140 and 142.

In some embodiments, the prongs 136 and 138 pivotally connect to the enclosure 144 using pins 154 and 156, respectively.

Turning back to FIG. 4 briefly, in some embodiments, the housing tray 102 is provided with a stabilizer 158 that pivotally extends from a lower part of the housing tray 102. The stabilizer 158 is configured to contact the electrical outlet 114 or a wall 116 of the electrical outlet 114.

Turning now to FIGS. 9-17, which collectively illustrate another example device 200, which is constructed in accordance with the present technology. The device includes plurality of housing trays. In one embodiment, the plurality of housing trays includes a first housing tray 202, a second housing tray 204, and a third housing tray 206. The device 200 can comprise additional of fewer housing trays than those illustrated. An electrical device (also referred to herein as personal electronic device) 208 is disposed in the first housing tray 202.

The second housing tray 204 is provided with an electrical connector 210 that includes prongs 218. The third housing tray 206 comprises a stabilizer 212 that is capable of being disposed in a stored configuration (see FIG. 9), and a deployed configuration (see FIG. 10). The third housing tray 206 is pivotally or hingedly connected (for example, at third wheel 236) to the second housing tray 204 (see FIG. 15 or FIG. 16) and, in some embodiments, supports the weight of the personal electronic device 208 by contacting the wall 209 or the electrical outlet 211 (see FIG. 11).

Figure 12:
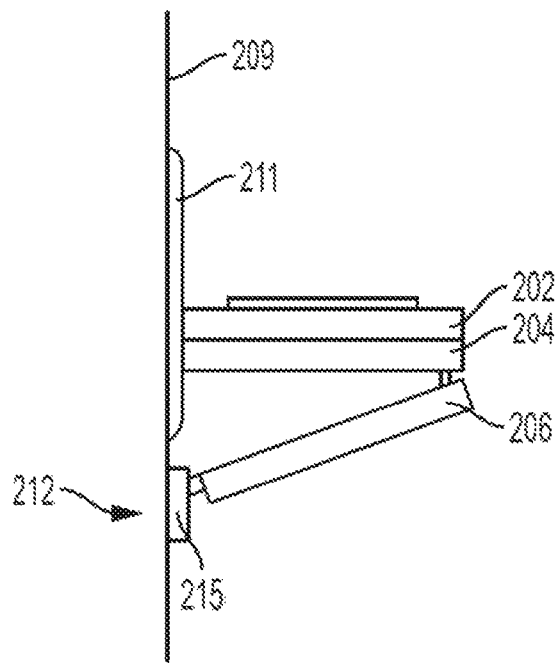
FIG. 12 is a side view of the device of FIG. 9 plugged into an outlet and supported on a wall by a two section stabilizer.

As illustrated in FIG. 12, the stabilizer 212 (or a section of the stabilizer 212) rotates when extended from the third housing tray 206 such that a mating surface 215 of the stabilizer 212 rests flat against the wall 209 or the electrical outlet 211.

Figure 13:
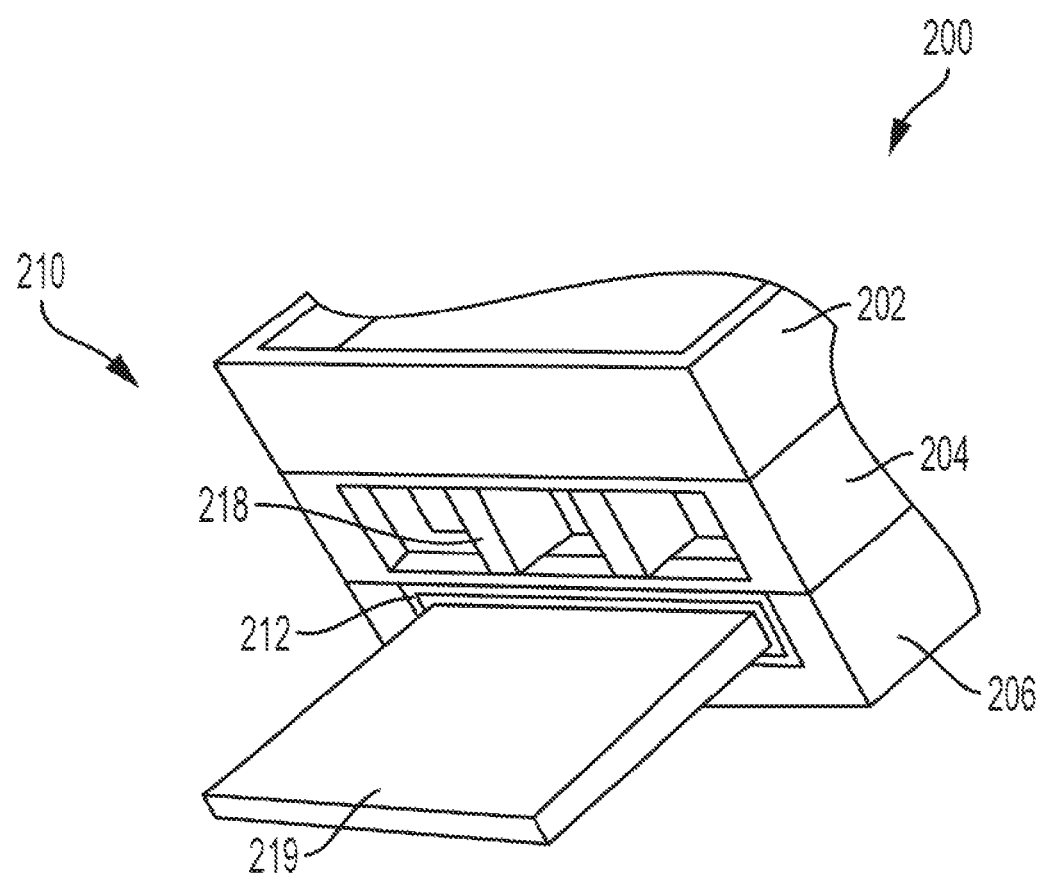
FIG. 13 is a perspective view of a stabilizer with an internal stabilizer flap.

FIG. 13 illustrates the stabilizer 212, which includes an internal stabilizer flap 219 that extends from the stabilizer 212.

In some embodiments, the hinged movement of the third housing tray 206 relative to the second housing tray 204 causes the linear movement of the electrical connector 210. For example, hinged movement of the third housing tray 206 causes the electrical connector 210 translate along a horizontal axis H when moving between the deployed and stored configurations. Additional details regarding the movement of the electrical connector 210 are provided with respect to FIGS. 16-17.

Figure 14:
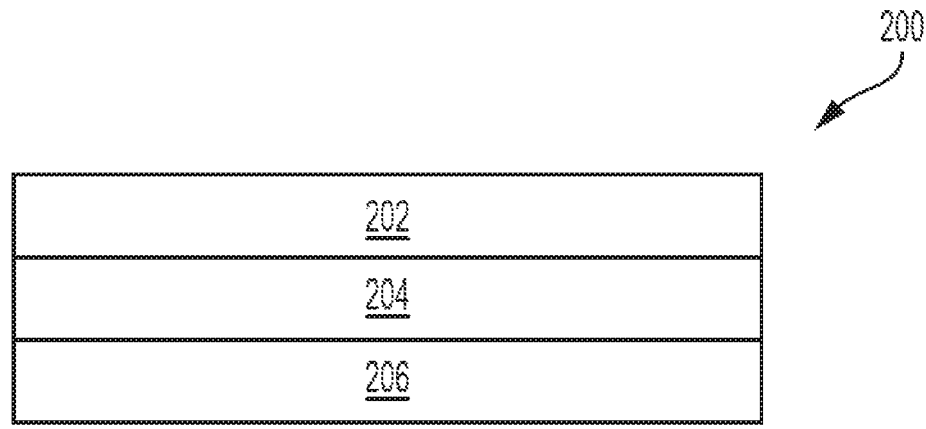
FIG. 14 is a perspective view of the device of FIG. 9, in a stored configuration.
Figure 15:
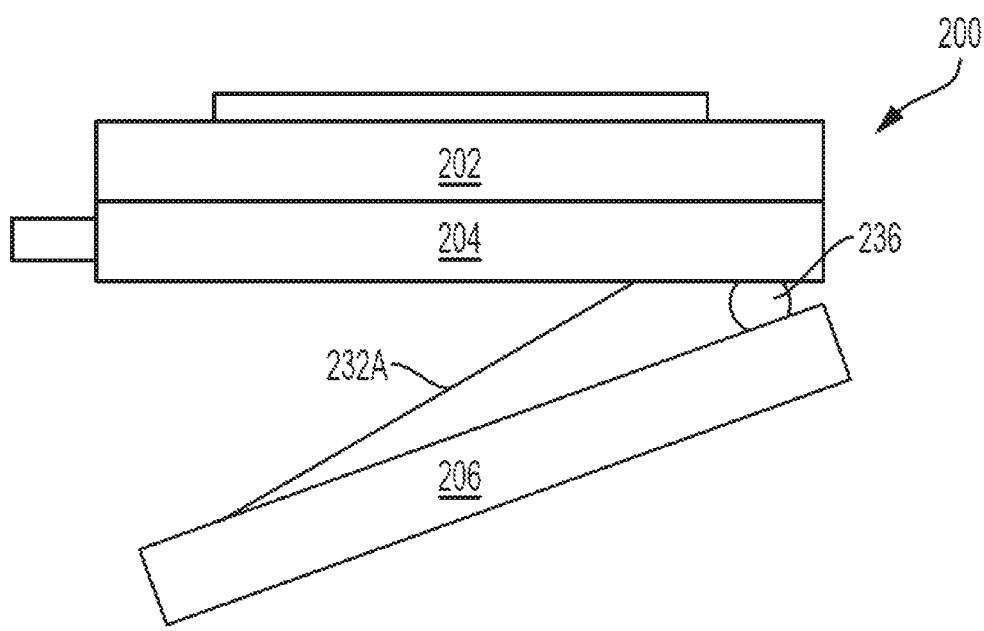
FIG. 15 is a perspective view of the device of FIG. 9, in a deployed configuration, showing vertical and horizontal axes of travel.

FIGS. 14 and 15 illustrate side elevational views of the device 200 in both a retracted (FIG. 14) and a deployed configuration (FIG. 15).

Figure 16:
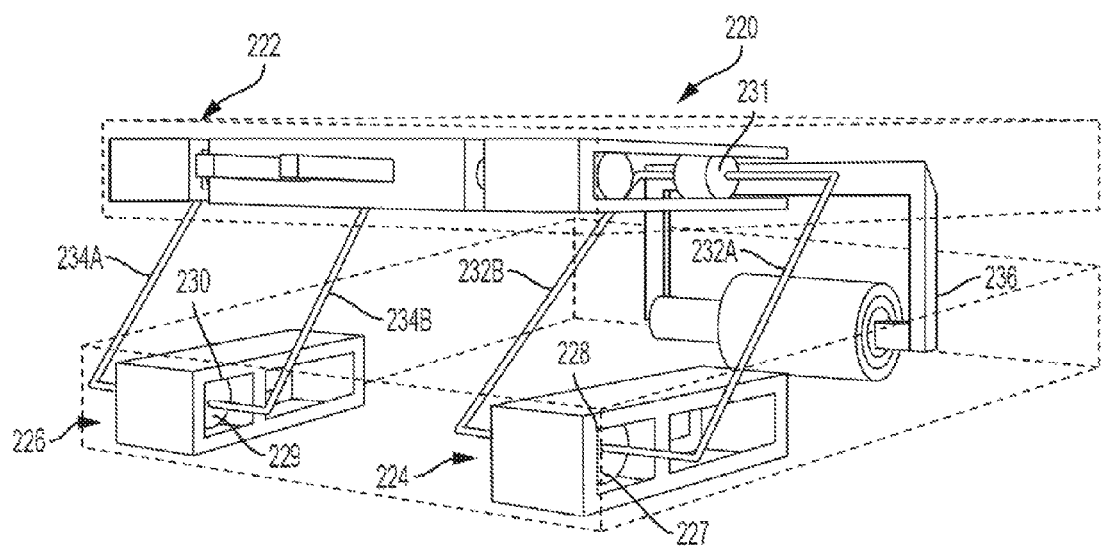
FIG. 16 is a perspective view of a pair of upper and lower guides with hinges attached.
Figure 17:
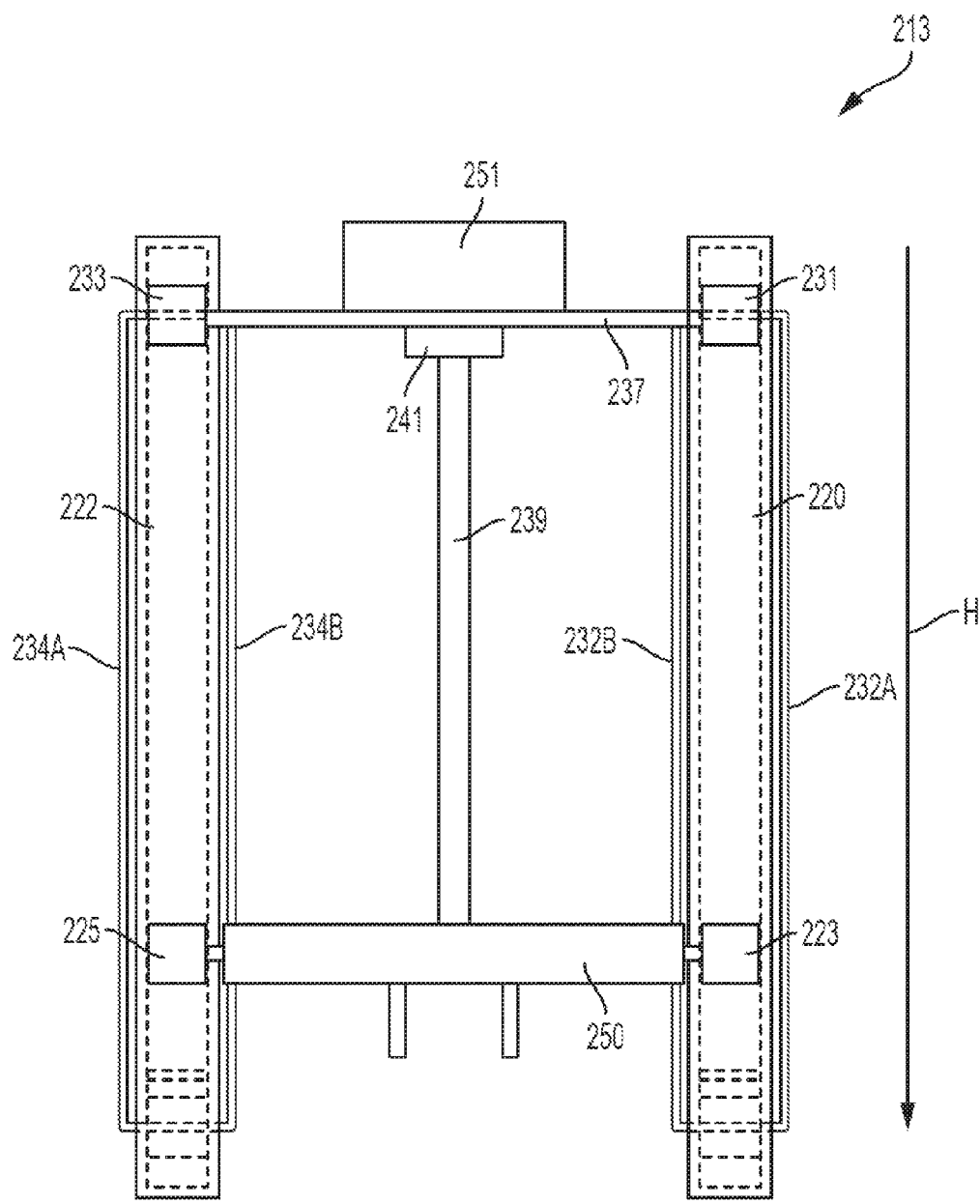
FIG. 17 is a top down view of the pair of upper and lower guides with hinges attached of FIG. 16.

FIGS. 16 and 17 collectively illustrate an example electrical connector actuator assembly 213 that is configured to move the electrical connector 210 between deployed and/or stored configurations.

The assembly 213 comprises a pair of upper guides 220 and 222, and the second housing tray comprises a pair of lower guides 224 and 226. The upper guides 220 and 222 are associated with the second housing tray 204 and the lower guides are associated with the third housing tray 206.

The upper guides 220 and 222 comprise substantially rectangular frames that are configured to receive wheels 223 and 225 therein, as described below. The wheels 223 and 225 will translate or travel within the upper guides 220 and 222, which causes the electrical connector 210 to move along the horizontal axis H. In some embodiments, as illustrated in FIG. 17, the circuit and enclosure 250 is coupled with the upper guides 220 and 222 using the wheels 223 and 225.

The lower guides 224 and 226 also comprise rectangular frames that each comprises a confinement area such as confinement areas 228 and 230 that are configured to receive wheels 227 and 229. The confinement areas 228 and 230 allow the wheels to rotate therein but not translate along the guides 224 and 226.

A fourth wheel 231 and fifth wheel 233 are also within the upper guides 220 and 222. The fourth wheel 231 and fifth wheel 233 are joined to an axle 237.

A strut 239 extends between the enclosure 250 and the axle 237. The strut 239, in some embodiments, is coupled to the axle 237 with an annular ring 241 that allows the axle 237 to freely rotate while allowing the axle to push and/or pull the strut along the horizontal axis H as the wheels 231 and 233 translated within the upper guides 220 and 222.

In one embodiment, the fourth wheel 231 of the pair of upper guides is connected to a first wheel 227 of the pair of lower guides with first armatures 232A and 232B. Likewise the fifth wheel 233 of the pair of upper guides is connected to a second wheel 229 of the pair of lower guides with second armatures 234A and 234B.

As illustrated in FIG. 17, the assembly 213 comprises a hinge that functions to displace the axle 237. Because the enclosure 250 and is coupled to the axle 237 by the strut 239, movement of the axle 237 forwardly and/or rearwardly along the horizontal axis will cause the enclosure 250 and prongs to deploy or retract. When the third housing tray 206 is hinged away from the second housing tray 204, the hinge 251 pushes the axle 237 forwardly, pushing the enclosure 250 into a deployed position. Likewise, when the third housing tray 206 is hinged upwardly towards the second housing tray 204, the hinge 251 pushes the axle 237 rearwardly, pushing the enclosure 250 into a deployed position Because of the connection of the wheels with the first and second armatures, and the non-translation of the wheels 227 and 229, the wheels 231 and 233 of the upper guides 220 and 222 will translate, pushing the axle 237.

Figure 18:
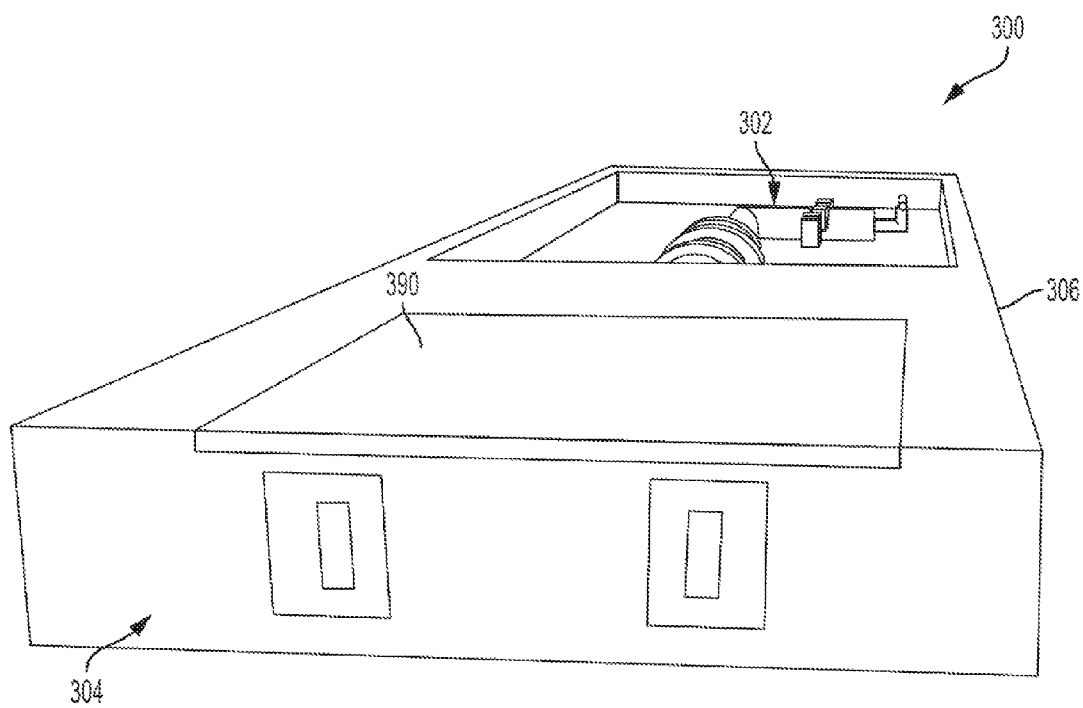
FIG. 18 is a perspective view of another example second housing tray that comprises a pushrod assembly.
Figure 19:
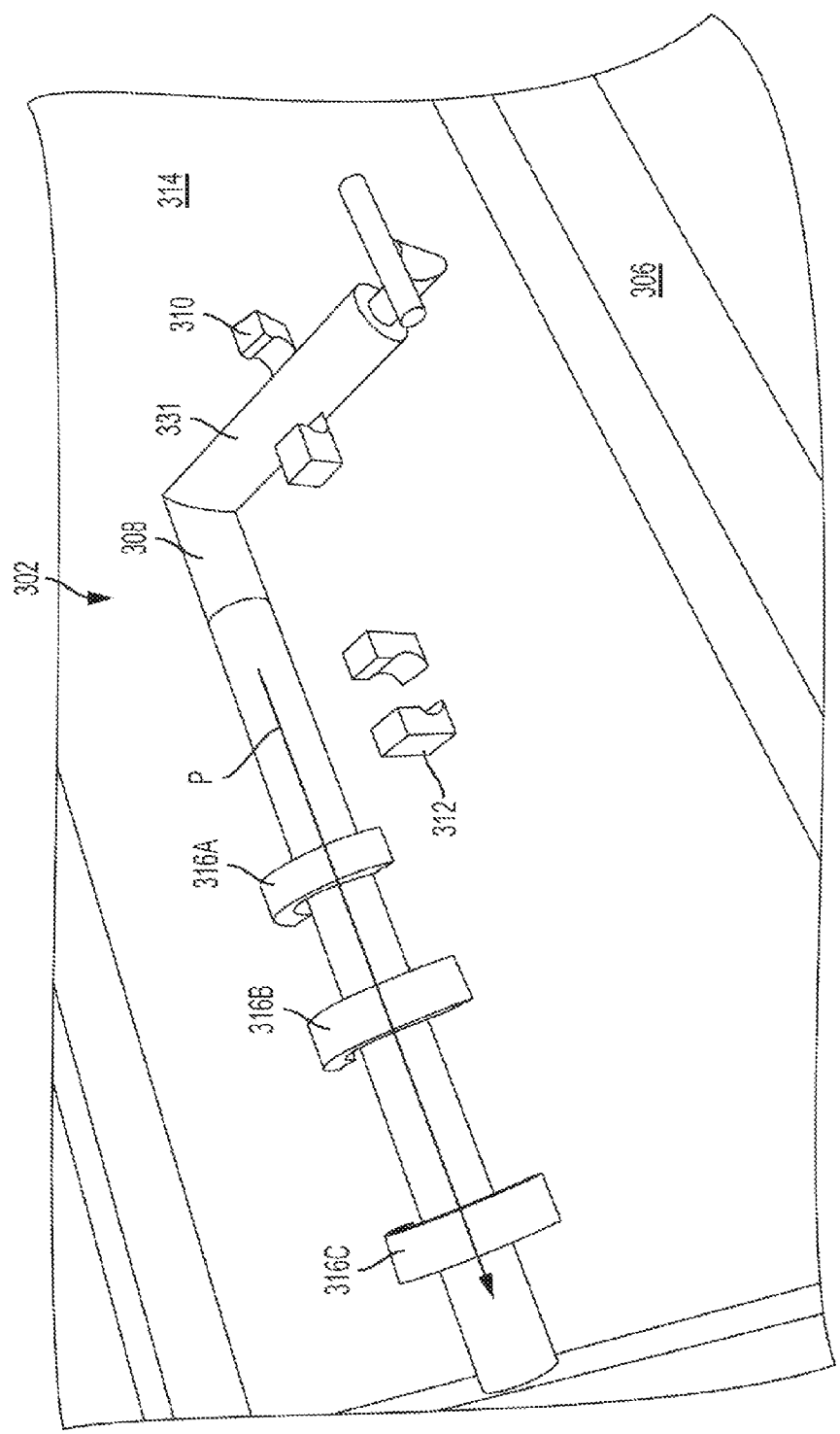
FIG. 19 is a perspective view of the pushrod assembly.
Figure 20:
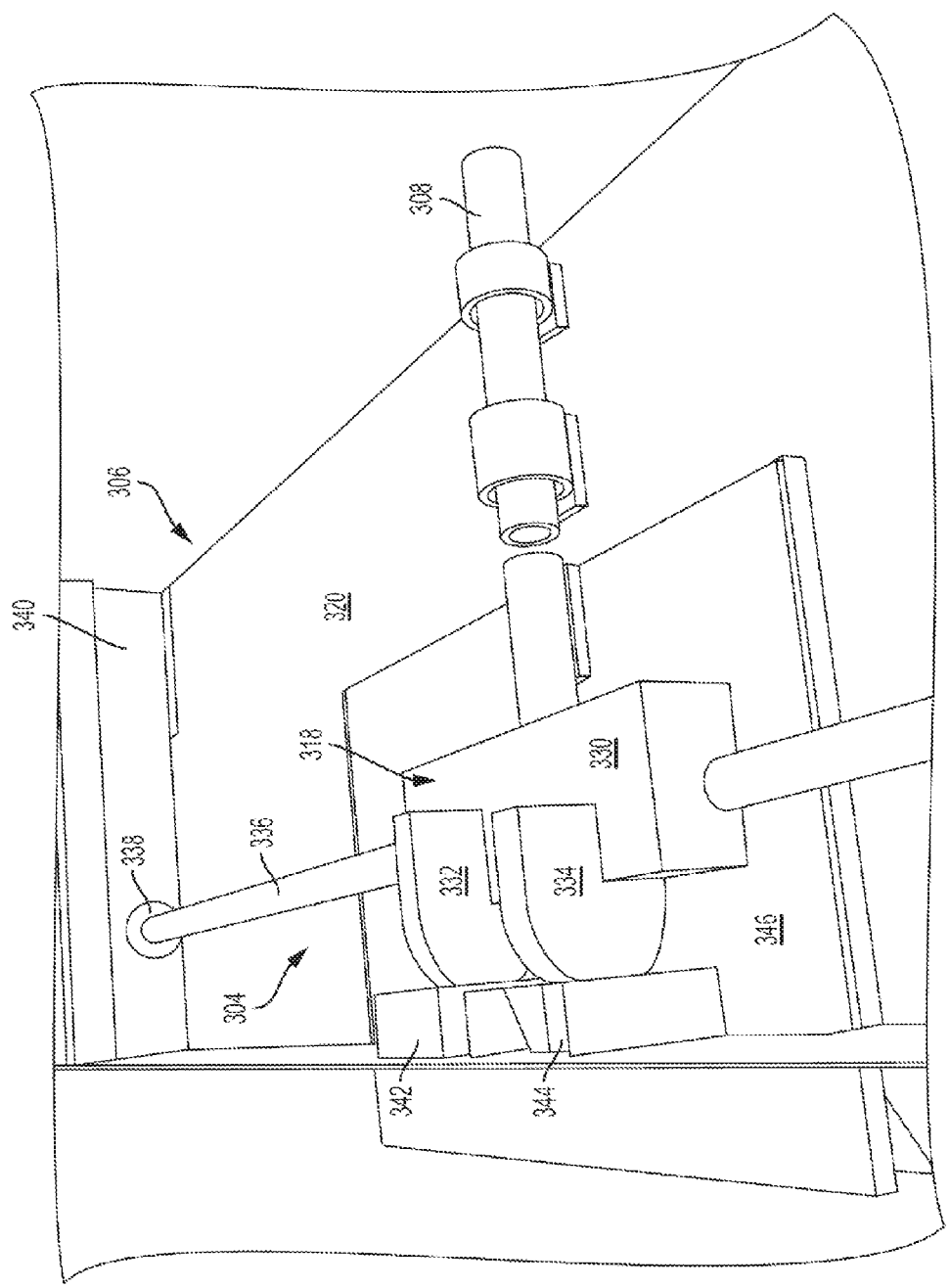
FIG. 20 is a perspective view of the pushrod assembly in combination with a circuit enclosure and electrical connector.

Referring now to FIGS. 18-20, another example device 300 is illustrated. This device 300 comprises a pushrod assembly 302 for moving an electrical connector 304 between deployed and stored configurations.

In FIG. 19, the pushrod assembly 302 is disposed within a second housing tray 306 of the device 300. The pushrod assembly 302 comprises a pushrod 308, a first clip 310 for storing the pushrod 308 when the electrical connector 304 is in the stored configuration (see FIG. 18). A second clip 312 is provided for storing the pushrod 308 when the electrical connector 304 is in the deployed configuration where the prongs are extended. The second housing tray 306 can replace the second housing tray 204 of FIG. 7, for example.

The pushrod embodiment can also comprise a stabilizer 390 that is integrated the bottom surface of the second housing tray 306. The stabilizer 390 is illustrated in greater detail in FIG. 22.

The pushrod 308 is held in place in a cavity 314 of the second housing tray 306 using holders 316A-C.

The device 300 comprises a circuit 318, which can include any circuit that is similar or identical to the circuit of the device 100 of FIG. 1. The circuit 318 is disposed within an enclosure 320. The enclosure 320 also houses the electrical connector 304 such that prongs 322 and 324 of the electrical connector extend from the enclosure 320.

As with the embodiments of FIGS. 9-17, the device 300 includes three separate housing trays such as a first housing tray, the second housing tray, and a third housing tray. As with the device 200 of FIGS. 9-17, the third housing tray is pivotally connected to the second housing tray.

Figure 10A:
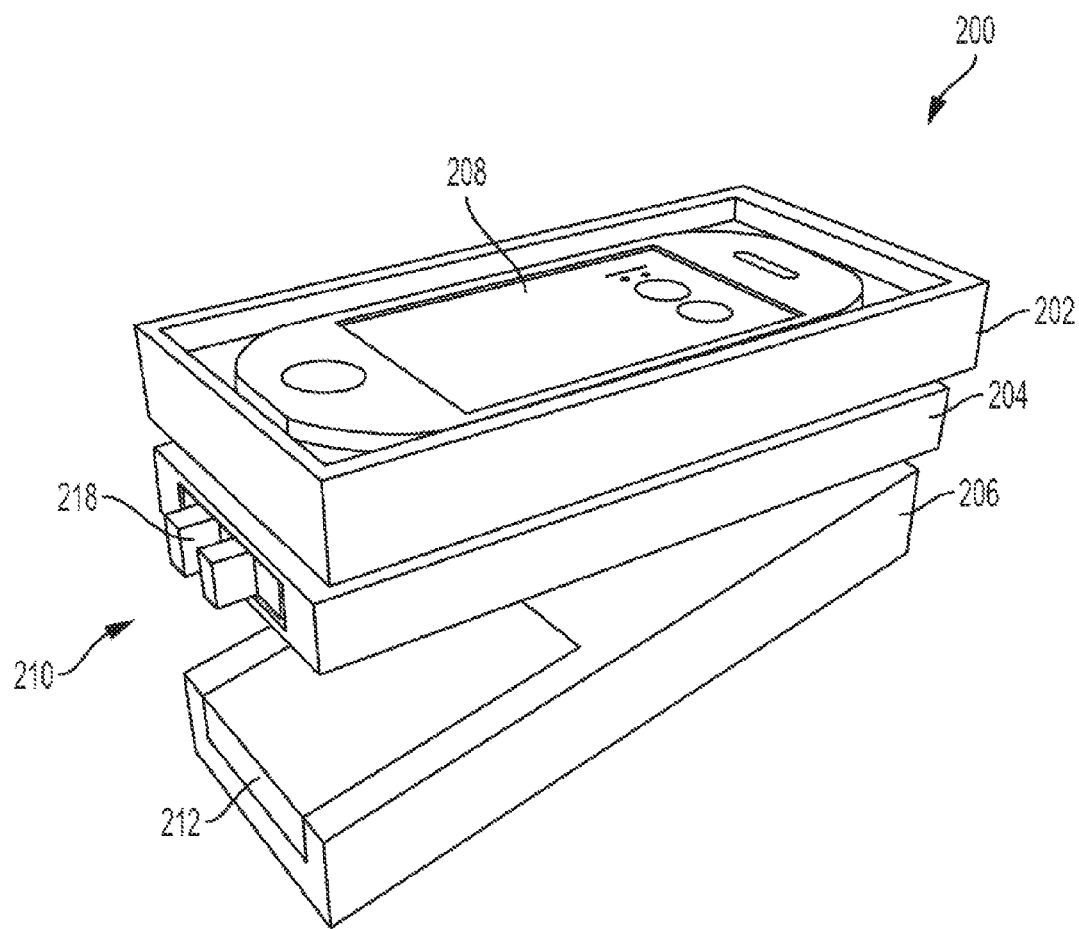
FIG. 10A is another perspective view of the device of FIG. 9.
Figure 10B:
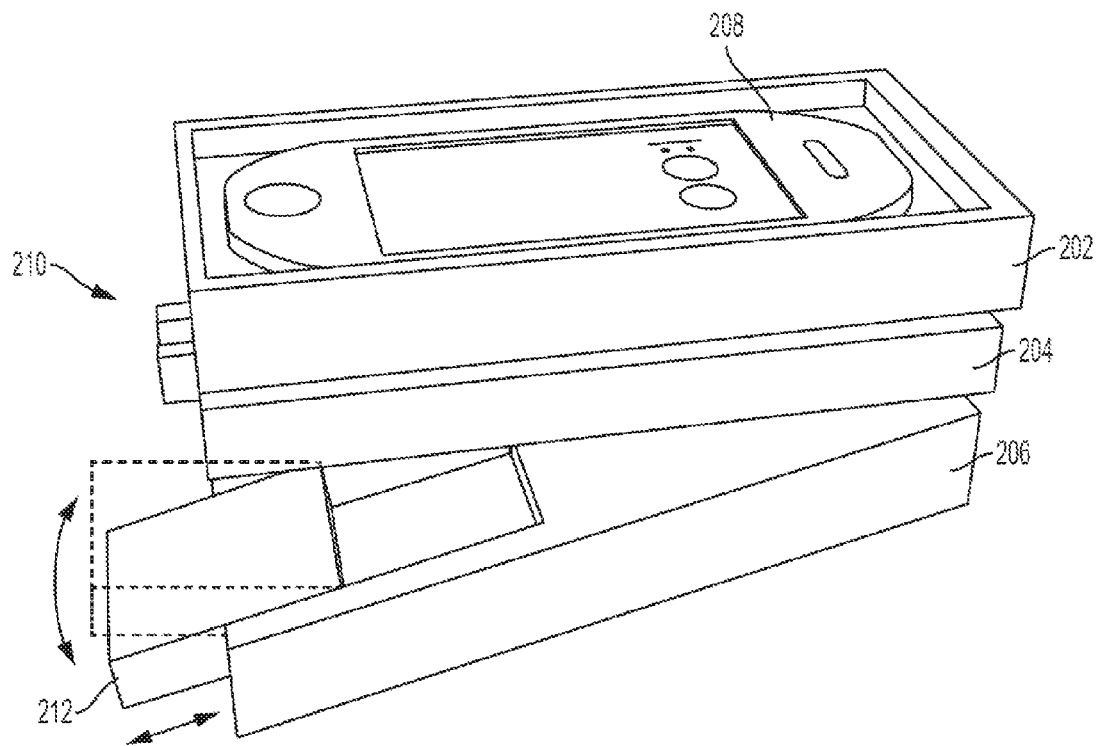
FIG. 10B is another perspective view of the device of FIG. 9, illustrating deployment of a stabilizer.
Figure 11:
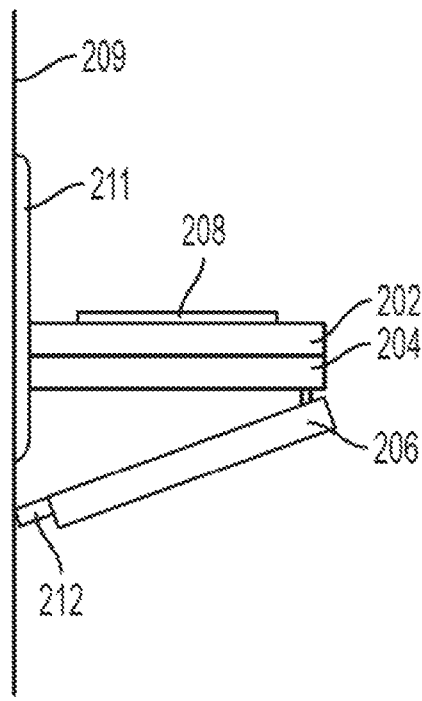
FIG. 11 is a side view of the device of FIG. 9 plugged into an outlet and supported on a wall by a stabilizer.

The pushrod 308 is accessible when the third housing tray is pivoted away from the second housing tray, as illustrated in FIG. 10.

The pushrod 308 has a substantially L-shape with an arm extension 331. The arm extension 331 locks into the first and/or second clips 310 and 312 as needed. When not locked into a clip, the arm extension 331 can be rotated about, and translated along a pushrod axis P to move the electrical connector 304 between the deployed and stored configurations.

As illustrated in FIG. 20, the electrical circuit 318 is enclosed within an enclosure 330. Prongs 332 and 334 are attached to the enclosure 330. For stability, the enclosure 330 is rotatably supported on both sides by a drive shaft 336 that includes wheels, such as wheel 338 that are disposed within tracks, such as track 340, fabricated into the sidewall of the second housing tray 306. As the pushrod 308 is moved along the pushrod axis P, the wheels translated within their respective tracks, allowing the prongs 332 and 334 to move in and out of prong apertures 342 and 344.

In some embodiments, a wall support or stabilizer 346 is also attached to the enclosure 330 (and positioned below the enclosure 330).

Figure 21:
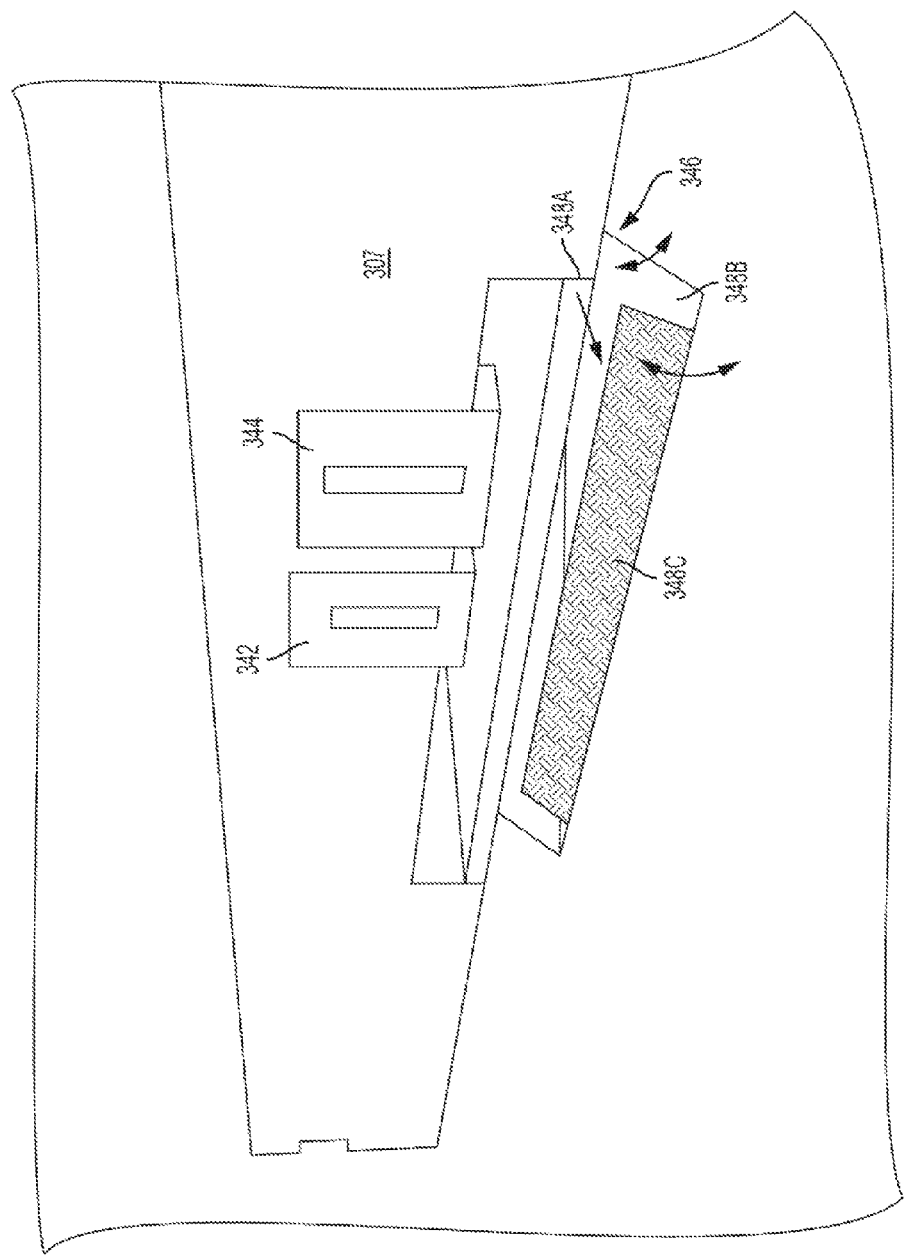
FIG. 21 is a perspective view of an example stabilizer comprising a plurality of stabilizer flaps.

In FIG. 21, the stabilizer 346 is provided with three sections or flaps 348A-C. A primary flap 348A extends from the third housing tray 307 when the pushrod 308 is moved forward. A secondary flap 348B pivots from the bottom of the primary flap 348A, and a tertiary flap 348C pivots outwardly from the top of the secondary flap 348B. Depending upon the geometry of the wall or outlet, the primary, secondary, or tertiary flaps can be deployed.

Figure 22:
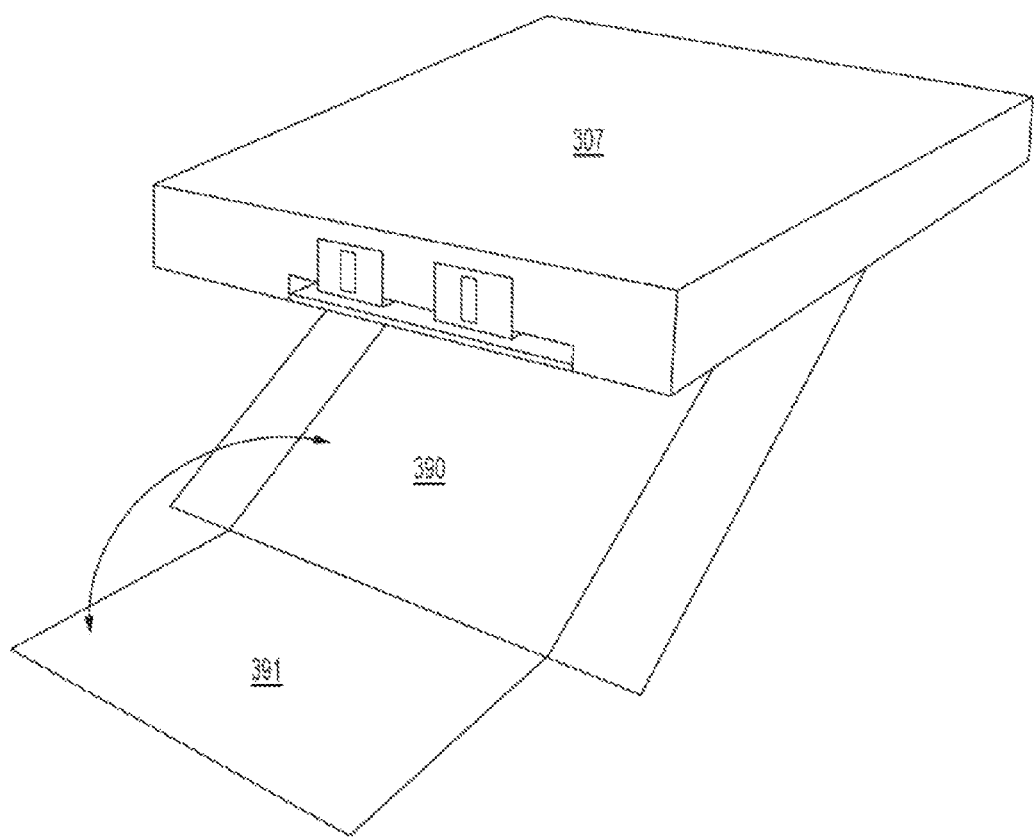
FIG. 22 is a perspective view of another example stabilizer.

In FIG. 22, the third housing tray 307 can comprise a pull down, pivoting stabilizer 390 that pivots from a lower portion of the third housing tray 307. In some embodiments, the pull down, pivoting stabilizer 390 comprises a secondary flap 391 that pivots away from the body of the pull down, pivoting stabilizer 390. The secondary flap 391 can contact a wall or other surface to stabilize the device when plugged into an electrical outlet.

The stabilizer 390 of FIG. 22 can alternatively be used in any housing tray embodiment described herein.

FIGS. 23-40 collectively illustrate additional embodiments of electrical charging devices that incorporate electrical input connectors such as USB connectors, micro USB connectors, and other similar electrical connectors that are configured to interface with power sources such as wall outlets or other charging devices.

Figure 23:
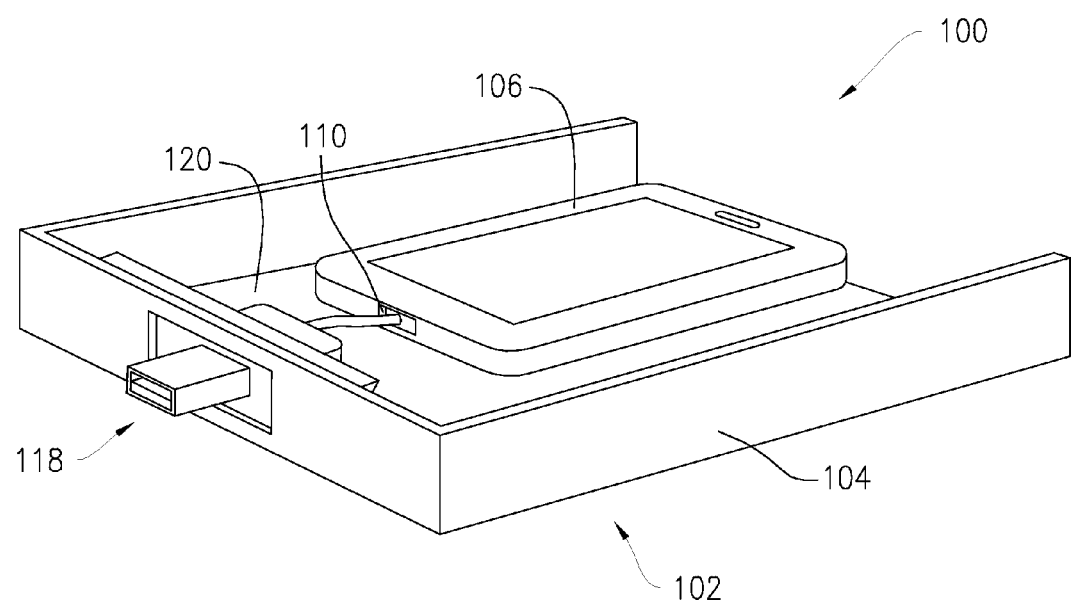
FIG. 23 is a perspective view of an example device of the present technology comprising a USB connector.
Figure 24:
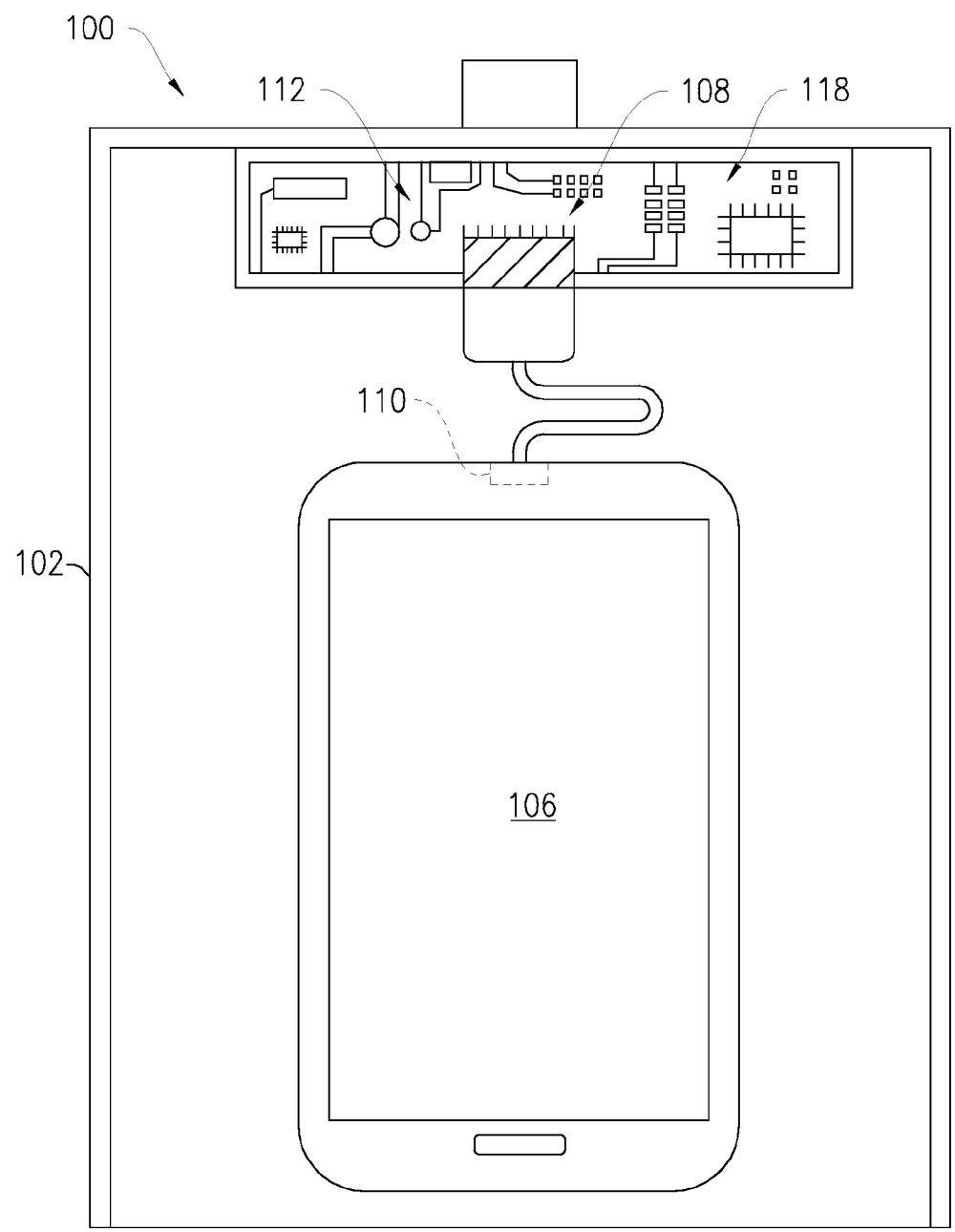
FIG. 24 is a top down view of the device of FIG. 23.
Figure 25:
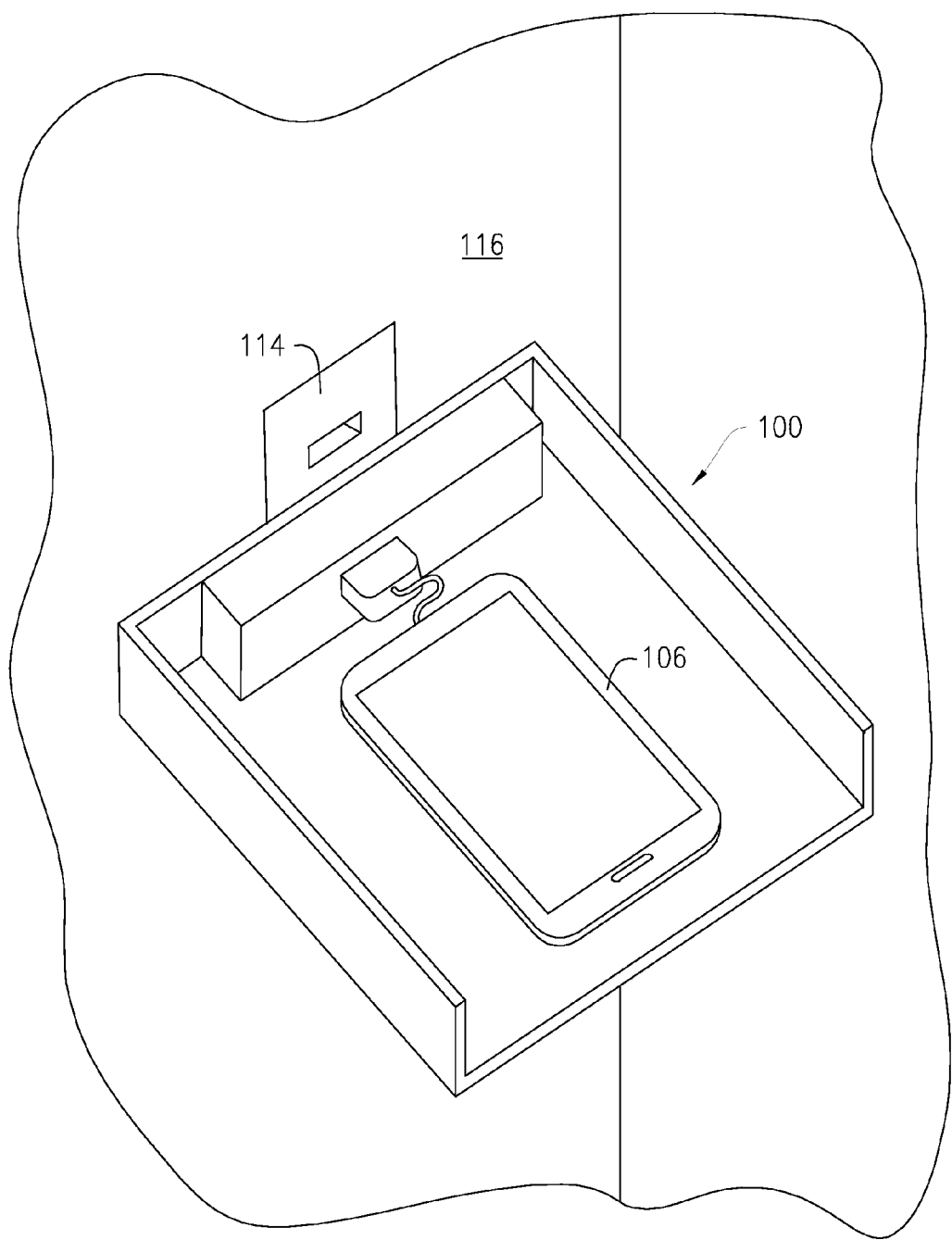
FIG. 25 is a perspective view of the device of FIG. 23, installed into an outlet of a wall.
Figure 26:
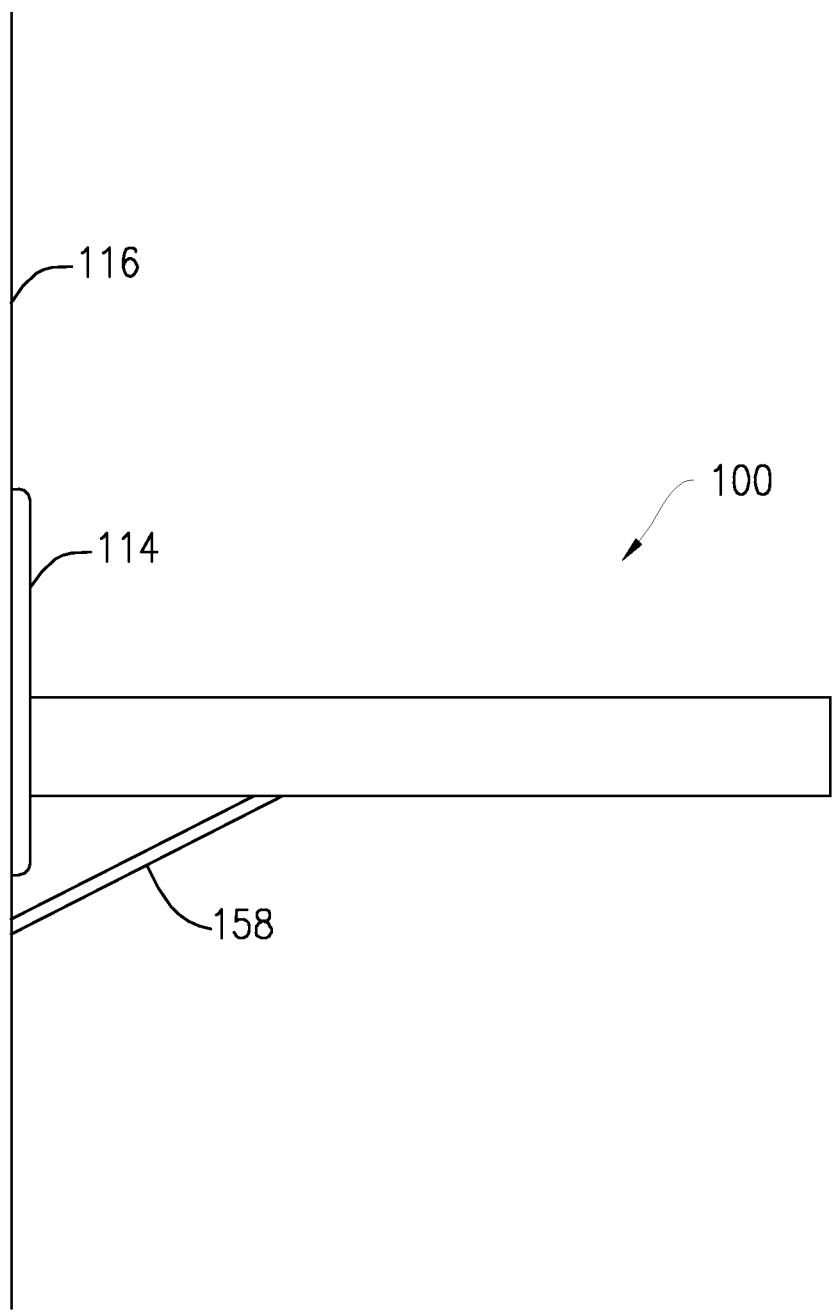
FIG. 26 is a side view of the device of FIG. 23, installed into an outlet of a wall.
Figure 27:
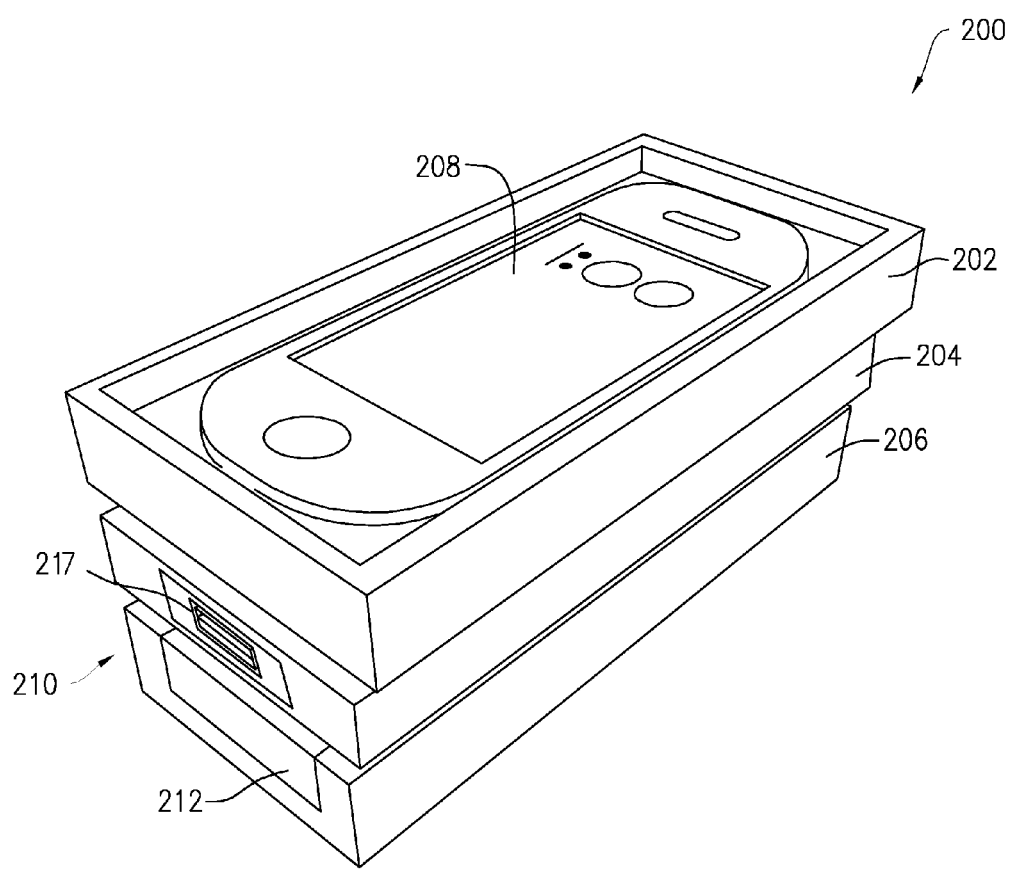
FIG. 27 is a perspective view of another example device of the present technology.
Figure 28A:
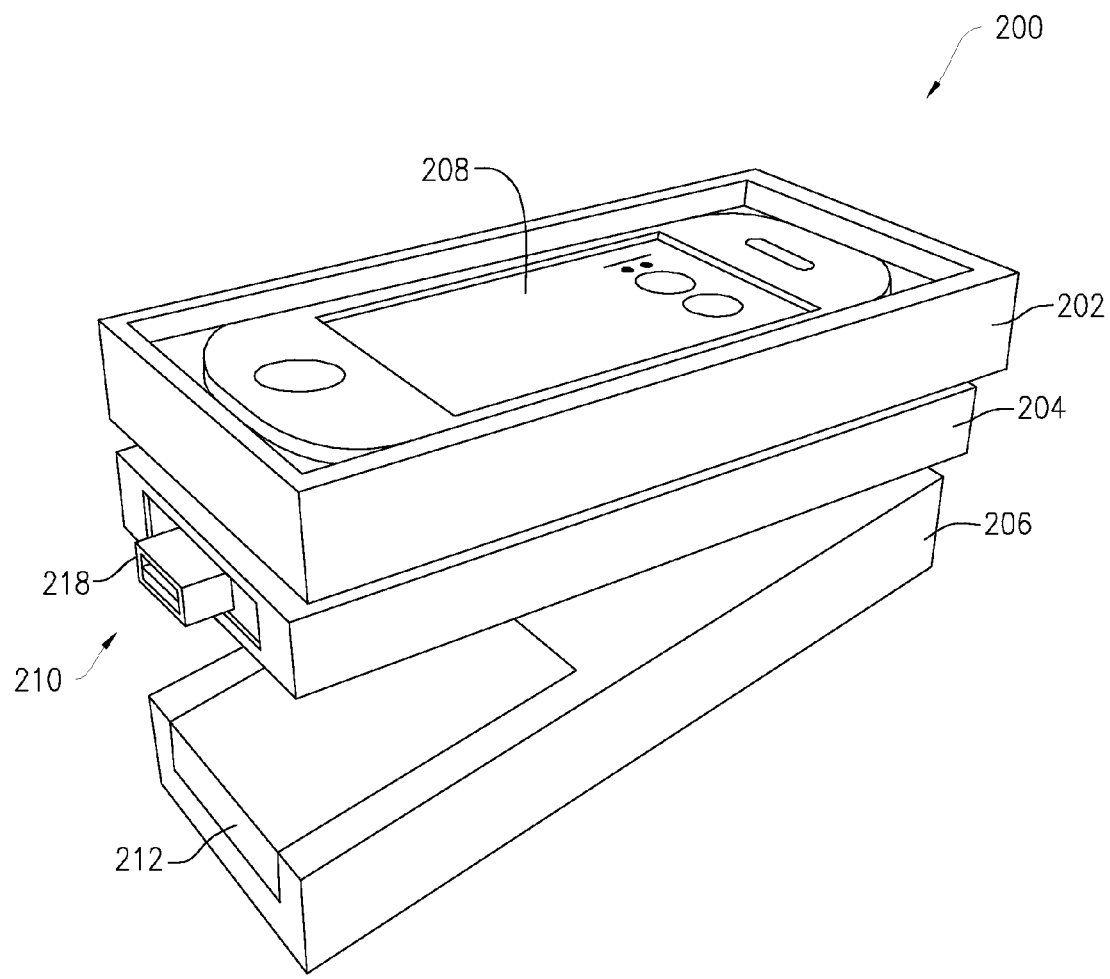
FIG. 28A is another perspective view of the device of FIG. 27.
Figure 28B:
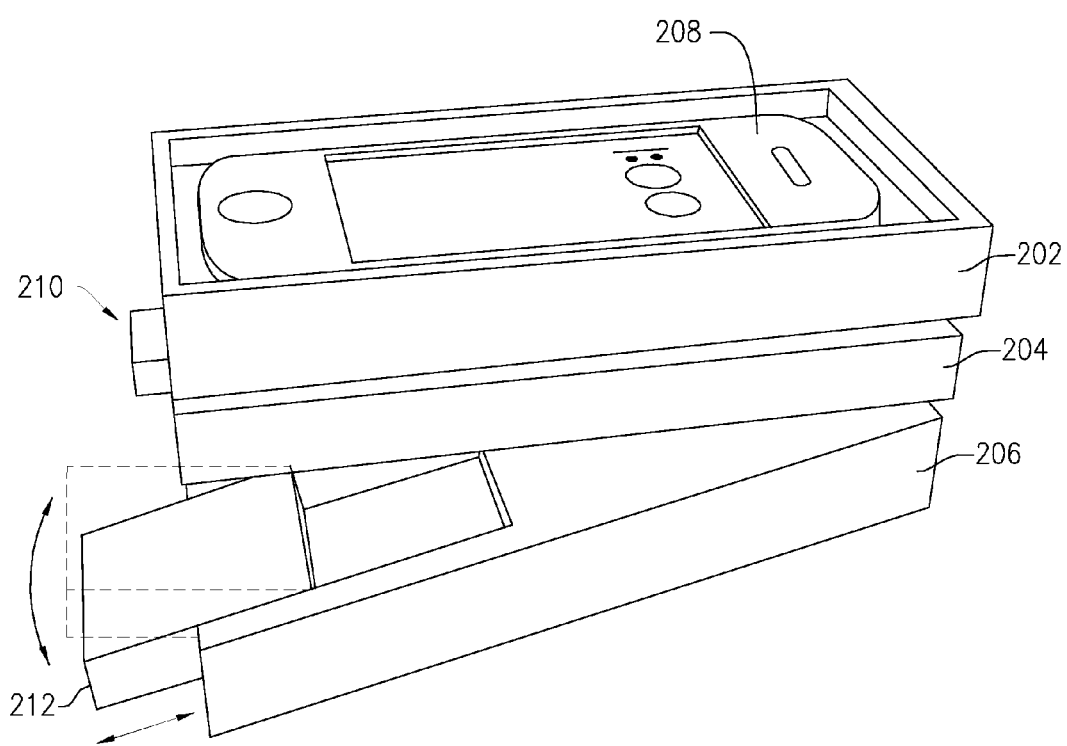
FIG. 28B is another perspective view of the device of FIG. 27, illustrating deployment of a stabilizer.

FIGS. 23-24 collectively illustrate an electrical charging device 100 that includes a housing tray 102 having a sidewall 104 extending perpendicularly from the housing tray 102. The housing tray 102 is configured to hold a personal electronic device 106.

The housing tray 102 comprises an electrical connector interface 108 that couples with a charging connector 110 of the personal electronic device 106, as illustrated in FIG. 24. The device 100 also includes a circuit 112 mounted on the housing tray 102 for converting alternating current received from an electrical outlet 114 of a wall 116 (see FIGS. 24 and 25) to direct current that charges the personal electronic device 106 through the electrical connector interface 108.

To be sure, the circuit 112 can also be configured to amplify or reduce DC power received from an electrical outlet 114. In one embodiment, the electrical outlet 114 includes a USB port that is configured to deliver DC power. Some embodiments of USB connectors, and specifically wall outlet based USB connections may carry AC power. Thus, the circuit 112 can be configured with any of the components of FIGS. 5 and 6 above.

In some embodiments, the circuit 112 can be omitted all together, such as when the DC source provides a DC power signal that does not require amplification or any signal processing.

In some embodiments, the device 100 includes an electrical connector 118 for electrically coupling the circuit 112 with the electrical outlet 114.

Rather than plugging into a electrical outlet 114, the electrical connector 118 can be coupled with a USB port of another computing device, such as a laptop computer or a charger device that plugs into a standard two or three pronged electrical wall outlet (as with the standard AC electrical outlet illustrated in the embodiment of FIG. 3).

As mentioned above, the electrical connector 118 can comprise a USB connector, a micro USB connector, or any other connector capable of interfacing with a DC source.

Some embodiments allow the electrical connector 118 to be configured to be placed in either a deployed configuration (see FIGS. 28A and 28B) where the electrical connector 118 can couple with the electrical outlet 114 or a stored configuration (see FIG. 27) where the electrical connector 118 cannot couple with the electrical outlet 114.

In more detail, the housing tray 102 includes a plate 120. The plate 120 supports the circuit 112 and the personal electronic device 106. The sidewall 104 extends around at least a portion of a periphery of the plate 120. In one example, the sidewall 104 extends around one or more sides, and in some embodiments four sides of the plate 120.

According to some embodiments, the circuit 112 can comprise a printed circuit board with various permutations of electrical components. In general, the circuit 112 is configured to transform the AC power waveform received from the outlet 114 into DC power that is appropriate for charging the personal electronic device 106.

In some embodiments, the circuit 112 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

Again, these circuitry features are required if the charging device 100 is coupled with an AC source, rather than a DC source, or if a DC source requires modification.

Turning back to FIG. 26 briefly, in some embodiments, the housing tray 102 is provided with a stabilizer 158 that pivotally extends from a lower part of the housing tray 102. The stabilizer 158 is configured to contact the electrical outlet 114 or a wall 116 of the electrical outlet 114.

Turning now to FIGS. 27-35, which collectively illustrate another example device 200, which is constructed in accordance with the present technology. The device includes plurality of housing trays. In one embodiment, the plurality of housing trays includes a first housing tray 202, a second housing tray 204, and a third housing tray 206. The device 200 can comprise additional of fewer housing trays than those illustrated. An electrical device 208 is disposed in the first housing tray 202.

The second housing tray 204 is provided with an electrical connector 210 that includes a USB connector 217. The third housing tray 206 comprises a stabilizer 212 that is capable of being disposed in a stored configuration (see FIG. 27), and a deployed configuration (see FIGS. 28A and 28B) The third housing tray 206 is pivotally or hingedly connected (for example, at third wheel 236) to the second housing tray 204 (see FIG. 33 and FIG. 34) and, in some embodiments, supports the weight of the personal electronic device 208 by contacting the wall 209 or the electrical outlet 211 (see FIG. 29 or FIG. 30).

Figure 29:
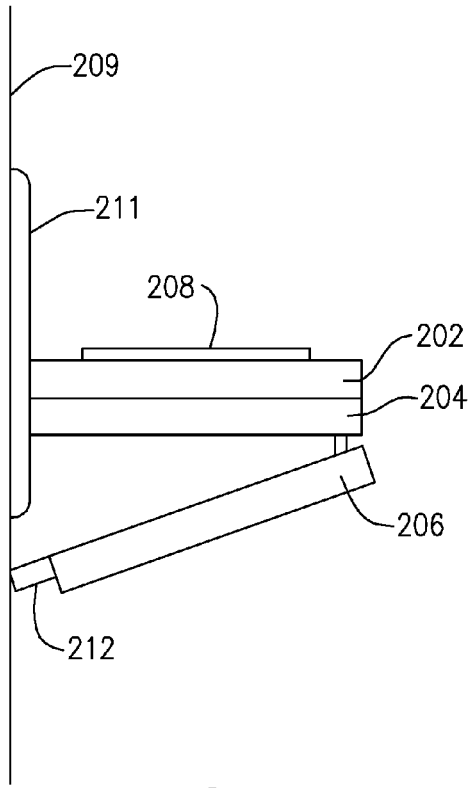
FIG. 29 is a side view of the device of FIG. 27 plugged into an outlet and supported on a wall by a stabilizer.

As illustrated in FIG. 29, the stabilizer 212 (or a section of the stabilizer 212) rotates when extended from the third housing tray 206 such that a mating surface 215 of the stabilizer 212 rests flat against the wall or the electrical outlet.

Figure 30:
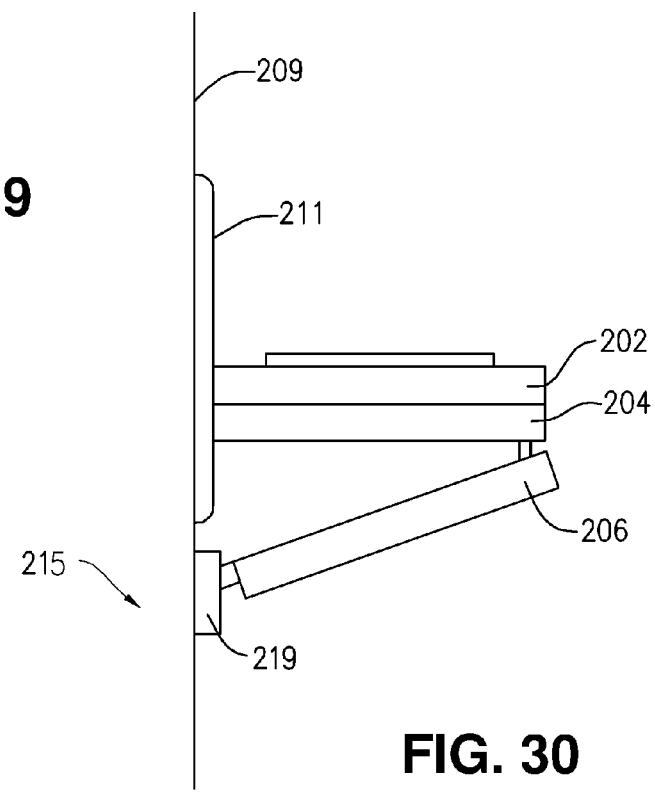
FIG. 30 is a side view of the device of FIG. 27 plugged into an outlet and supported on a wall by a two section stabilizer.
Figure 31:
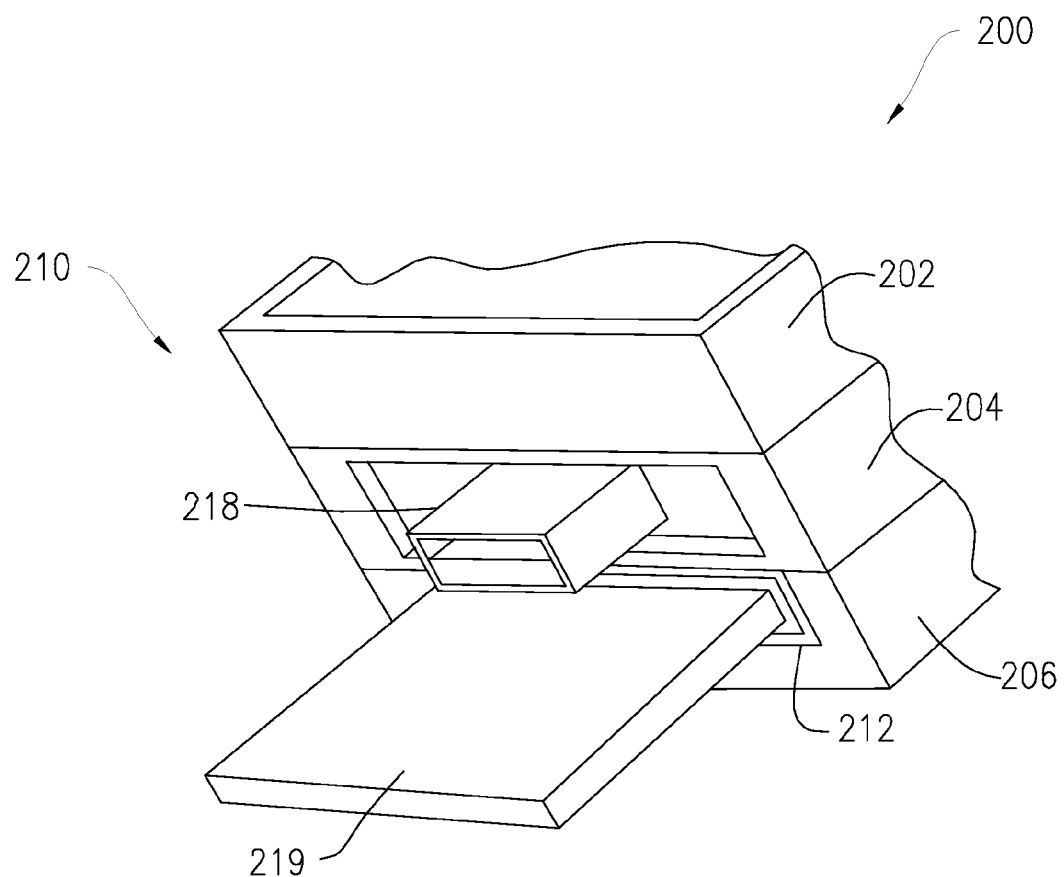
FIG. 31 is a perspective view of a stabilizer with an internal stabilizer flap.

FIG. 30 illustrates the stabilizer 212, which includes an internal stabilizer flap 219 that extends from the stabilizer 212.

In some embodiments, the hinged movement of the third housing tray 206 relative to the second housing tray 204 causes the linear movement of the electrical connector 210. For example, hinged movement of the third housing tray 206 causes the electrical connector 210 to translate along a horizontal axis H when moving between the deployed and stored configurations. Additional details regarding the movement of the electrical connector 210 are provided with respect to FIGS. 32-35.

Figure 32:
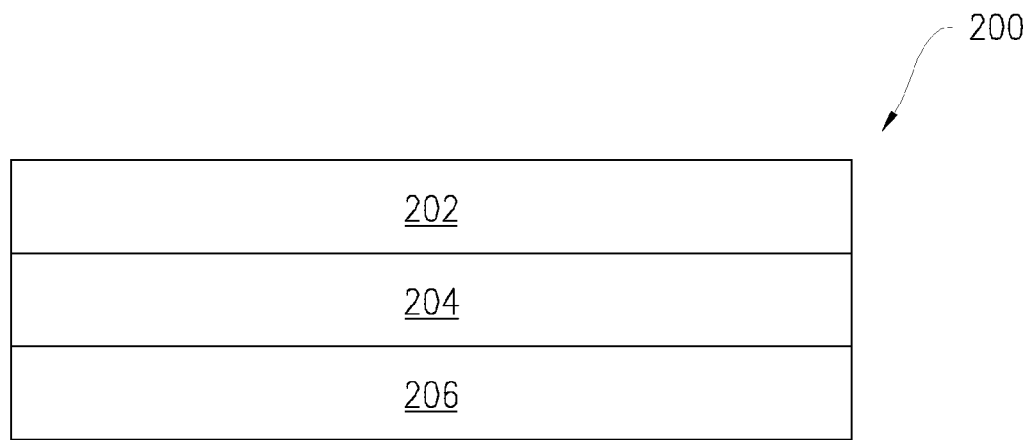
FIG. 32 is a perspective view of the device of FIG. 27, in a stored configuration.
Figure 33:
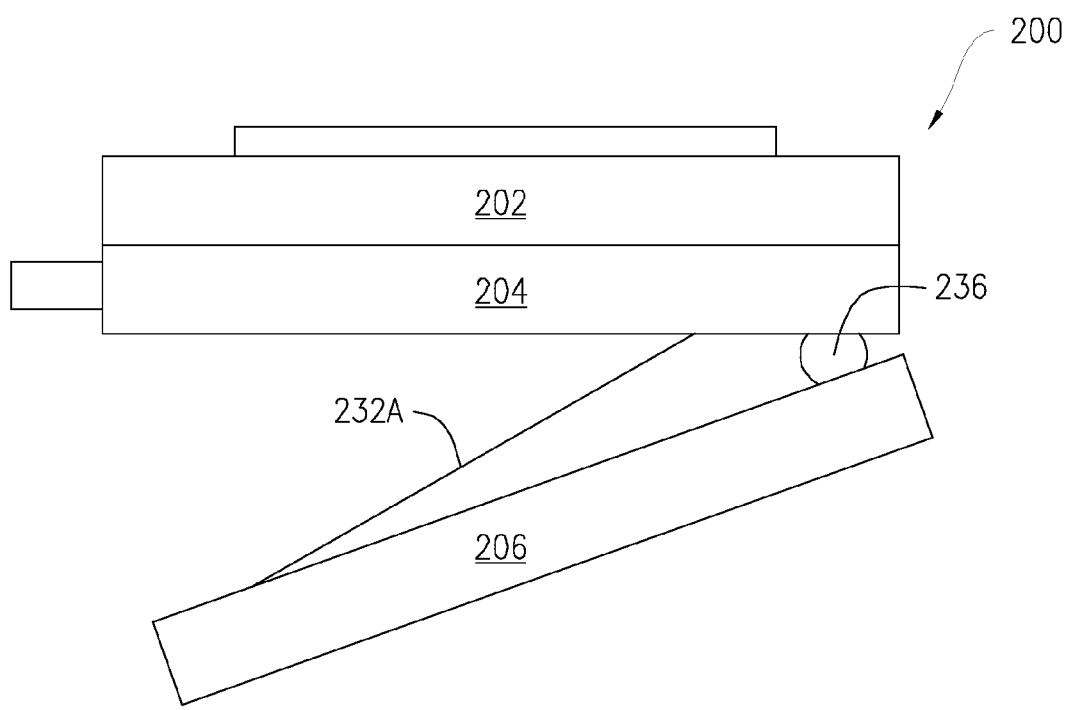
FIG. 33 is a perspective view of the device of FIG. 27, in a deployed configuration, showing vertical and horizontal axes of travel.

FIGS. 32 and 33 illustrate side elevational views of the device 200 in both a retracted (FIG. 32) and a deployed configuration (FIG. 33).

Figure 34:
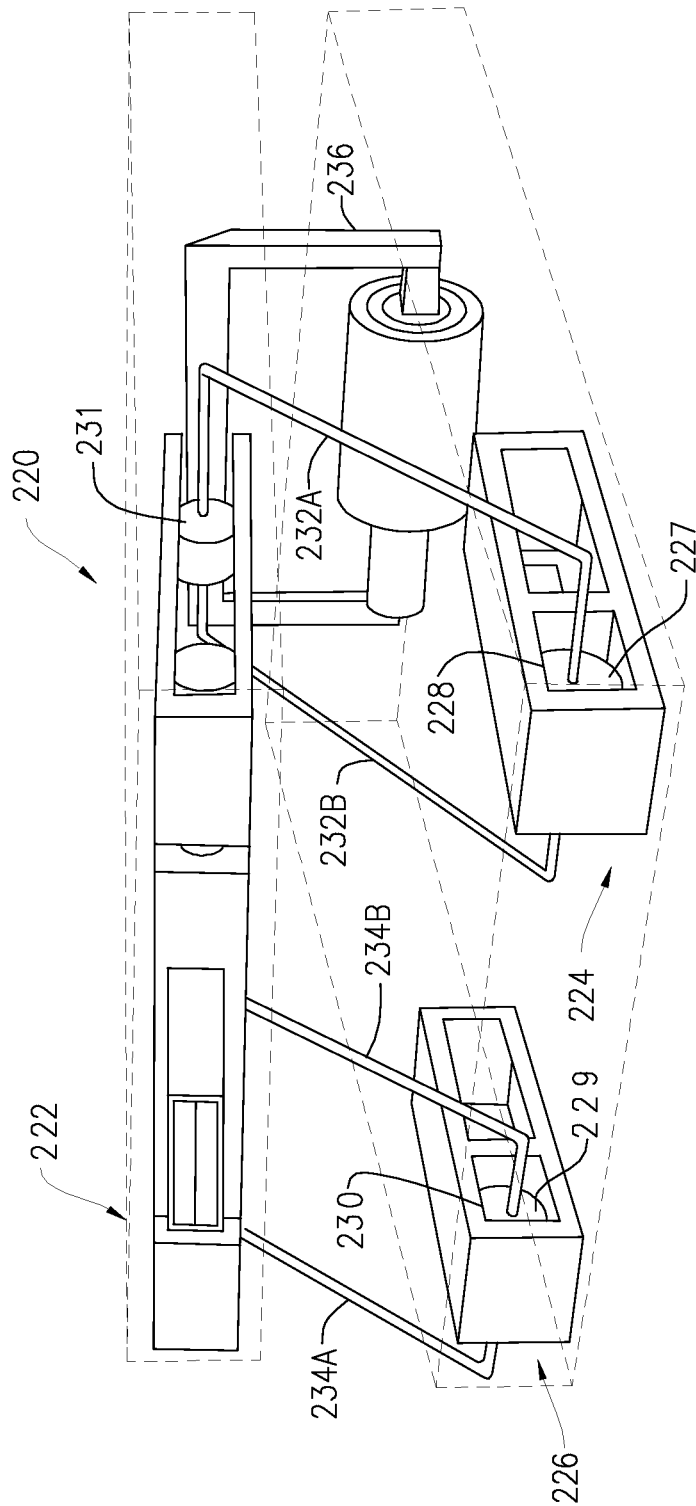
FIG. 34 is a perspective view of a pair of upper and lower guides with hinges attached.
Figure 35:
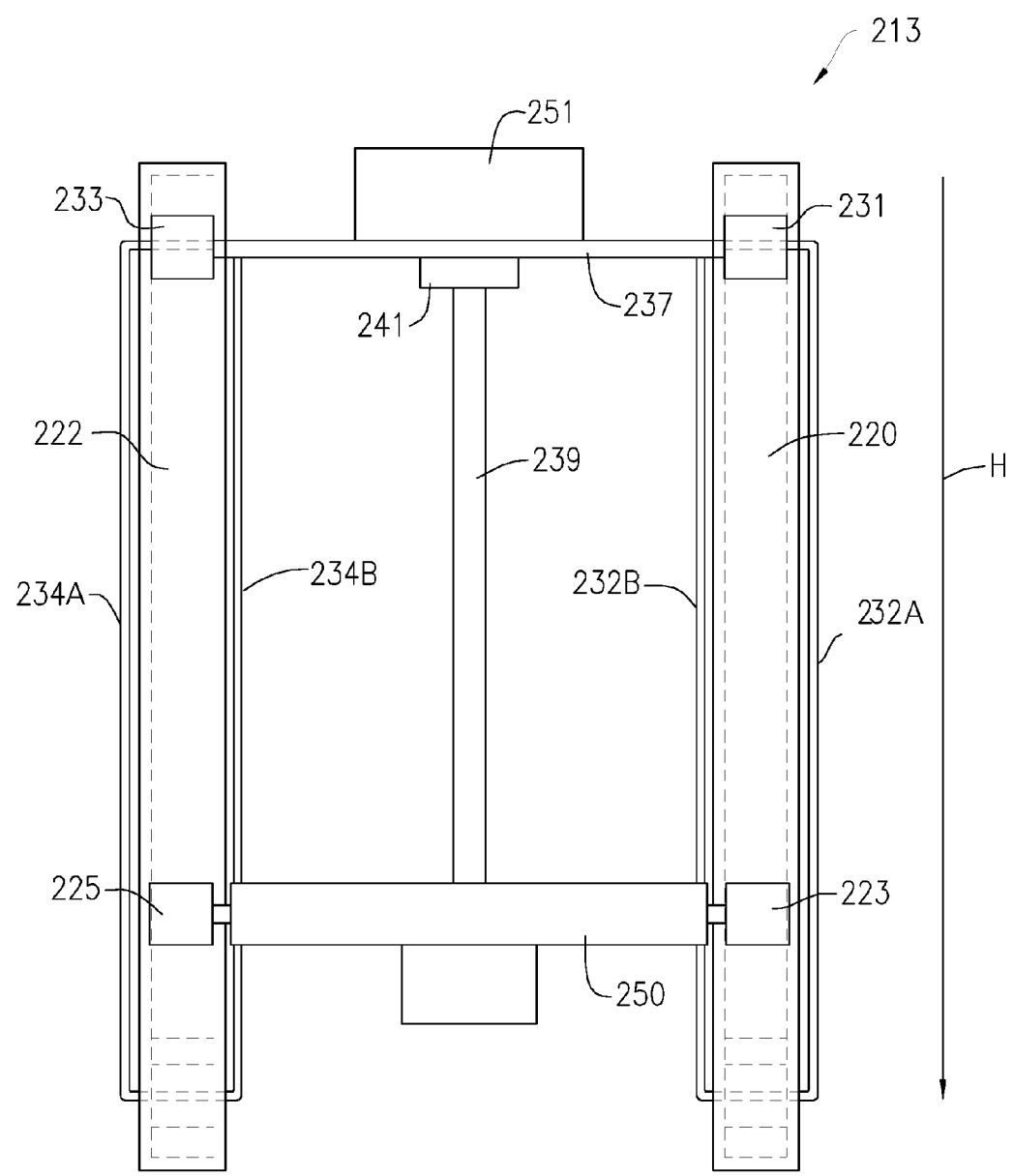
FIG. 35 is a top down view of the pair of upper and lower guides with hinges attached of FIG. 34.

FIGS. 34 and 35 collectively illustrate an example electrical connector actuator assembly 213 that is configured to move the electrical connector 210 between deployed and/or stored configurations.

The assembly 213 comprises a pair of upper guides 220 and 222, and the second housing tray comprises a pair of lower guides 224 and 226. The upper guides 220 and 222 are associated with the second housing tray 204 and the lower guides are associated with the third housing tray 206.

The upper guides 220 and 222 comprise substantially rectangular frames that are configured to receive wheels 223 and 225 therein, as described below. The wheels 223 and 225 will translate or travel within the upper guides 220 and 222, which causes the electrical connector 210 to move along the horizontal axis H. In some embodiments, as illustrated in FIG. 34, the circuit and enclosure 250 is coupled with the upper guides 220 and 222 using the wheels 223 and 225.

The lower guides 224 and 226 also comprise rectangular frames that each comprises a confinement area such as confinement areas 228 and 230 that are configured to receive wheels 227 and 229. The confinement areas 228 and 230 allow the wheels to rotate therein but not translate along the guides 224 and 226.

A fourth wheel 231 and fifth wheel 233 are also within the upper guides 220 and 222. The fourth wheel 231 and fifth wheel 233 are joined to an axle 237.

A strut 239 extends between the enclosure 250 and the axle 237. The strut 239, in some embodiments, is coupled to the axle 237 with an annular ring 241 that allows the axle 237 to freely rotate while allowing the axle to push and/or pull the strut along the horizontal axis H as the wheels 231 and 233 translated within the upper guides 220 and 222.

In one embodiment, the fourth wheel 231 of the pair of upper guides is connected to a first wheel 227 of the pair of lower guides with first armatures 232A and 232B. Likewise the fifth wheel 233 of the pair of upper guides is connected to a second wheel 229 of the pair of lower guides with second armatures 234A and 234B.

The assembly 213 comprises a hinge that functions to displace the axle 237. Because the enclosure 250 and is coupled to the axle 237 by the strut 239, movement of the axle 237 forwardly and/or rearwardly along the horizontal axis will cause the enclosure 250 and prongs to deploy or retract. When the third housing tray 206 is hinged away from the second housing tray 204, the hinge 251 pushes the axle 237 forwardly, pushing the enclosure 250 into a deployed position. Likewise, when the third housing tray 206 is hinged upwardly towards the second housing tray 204, the hinge 251 pushes the axle 237 rearwardly, pushing the enclosure 250 into a deployed position.

Because of the connection of the wheels with the first and second armatures, and the non-translation of the wheels 227 and 229, the wheels 231 and 233 of the upper guides 220 and 222 will translate, pushing the axle 237.

Referring now to FIGS. 37-40, another example device 300 is illustrated. This device 300 comprises a pushrod assembly 302 for moving an electrical connector 304 between deployed and stored configurations.

Figure 36:
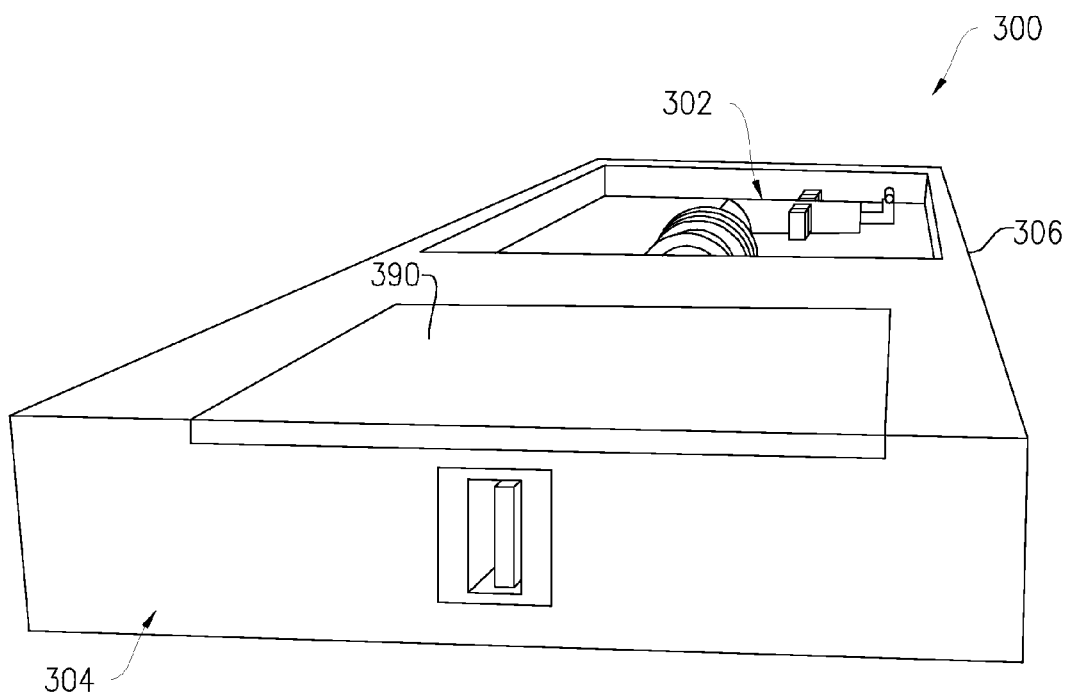
FIG. 36 is a perspective view of another example second housing tray that comprises a pushrod assembly.
Figure 37:
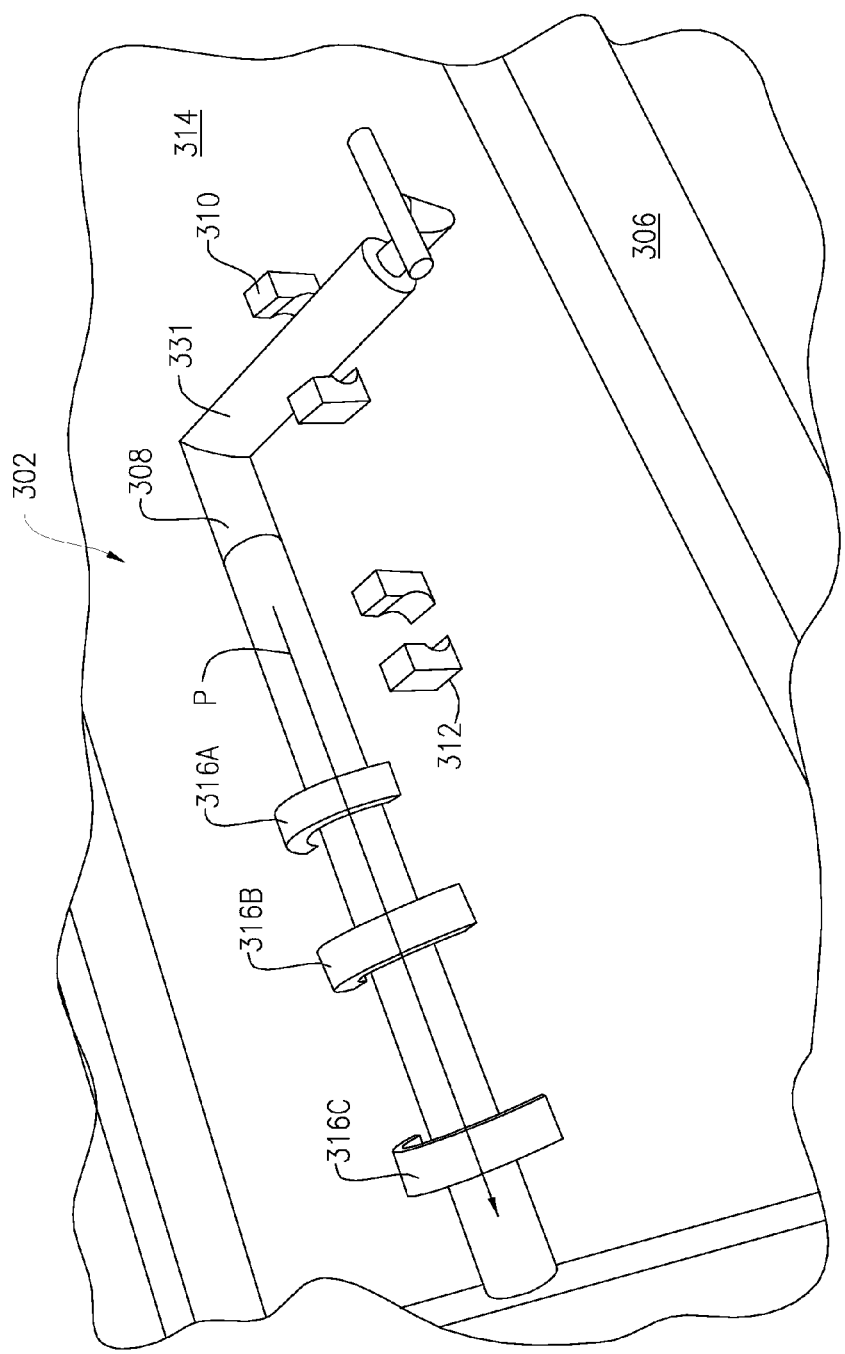
FIG. 37 is a perspective view of the pushrod assembly.

In FIGS. 36 and 37, the pushrod assembly 302 is disposed within a second housing tray 306 of the device 300. The pushrod assembly 302 comprises a pushrod 308, a first clip 310 for storing the pushrod 308 when the electrical connector 304 is in the stored configuration. A second clip 312 is provided for storing the pushrod 308 when the electrical connector 304 is in the deployed configuration where the prongs are extended. The second housing tray 306 can replace the second housing tray 204 of FIG. 27, for example.

The pushrod embodiment can also comprise a stabilizer 390 that is integrated the bottom surface of the second housing tray 306. The stabilizer 390 is illustrated in greater detail in FIG. 40.

The pushrod 308 is held in place in a cavity 314 of the second housing tray 306 using holders 316A-C.

The device 300 may comprise a circuit 318, which can include any circuit that is similar or identical to the circuit of the device 100 of FIG. 1. The circuit 318 is disposed within an enclosure 320. The enclosure 320 also houses the electrical connector 304 such that prongs 322 and 324 of the electrical connector extend from the enclosure 320.

In some embodiments, the device 300 includes three separate housing trays such as a first housing tray, the second housing tray, and a third housing tray. As with the device 200 of FIGS. 27-35, the third housing tray is pivotally connected to the second housing tray.

The pushrod 308 is accessible when the third housing tray is pivoted away from the second housing tray.

The pushrod 308 has a substantially L-shape with an arm extension 331. The arm extension 331 locks into the first and/or second clips 310 and 312 as needed. When not locked into a clip, the arm extension 331 can be rotated about, and translated along a pushrod axis P to move the electrical connector 304 between the deployed and stored configurations.

Figure 38:
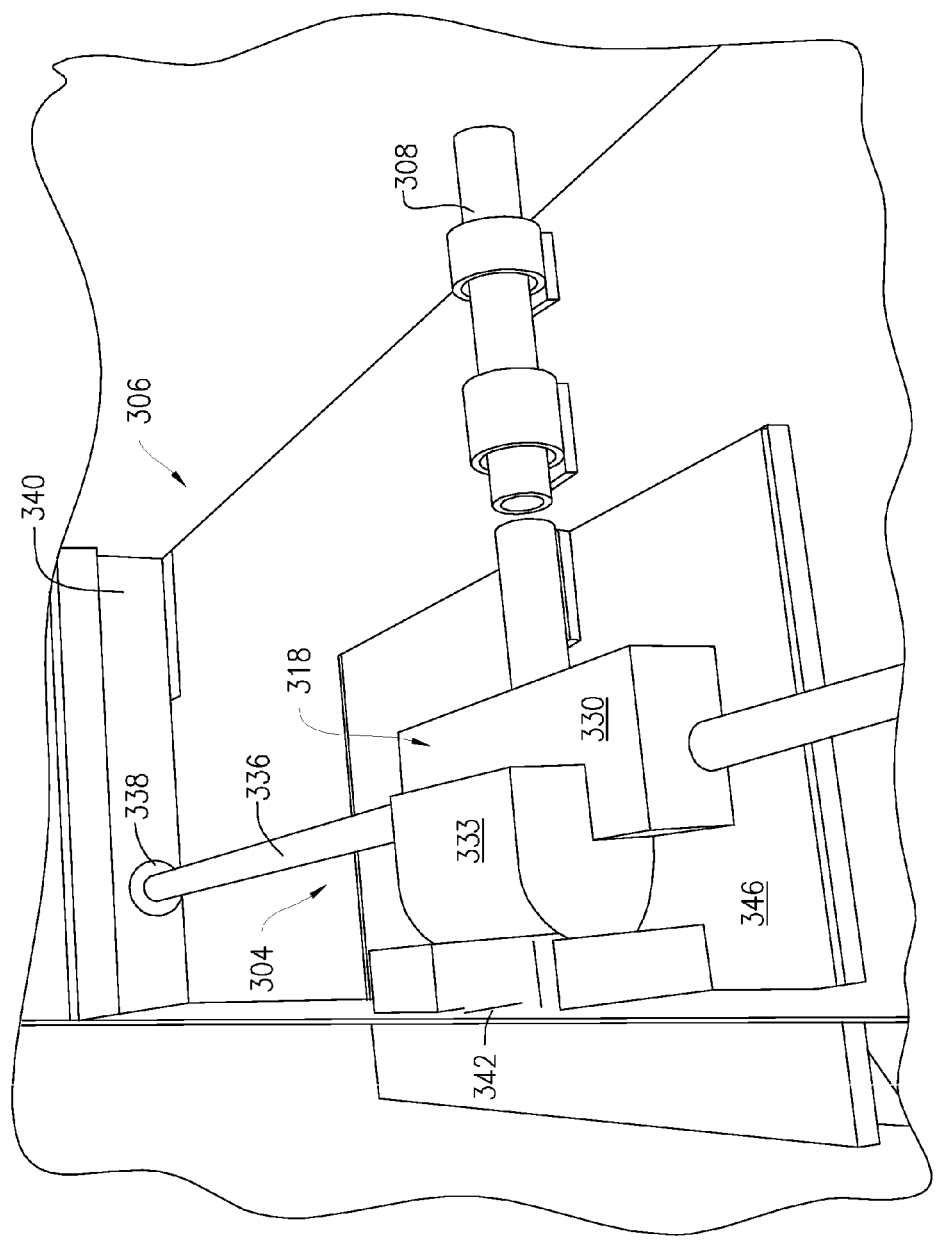
FIG. 38 is a perspective view of another example second housing tray that comprises a pushrod assembly.

As illustrated in FIGS. 37 and 38, the electrical circuit 318 is enclosed within an enclosure 330. USB connector 333 is attached to the enclosure 330. For stability, the enclosure 330 is rotatably supported on both sides by a drive shaft 336 that includes wheels, such as wheel 338 that are disposed within tracks, such as track 340, fabricated into the sidewall of the second housing tray 306. As the pushrod 308 is moved along the pushrod axis P (see FIG. 37), the wheels translated within their respective tracks, allowing the USB connector 333 to move in and out of an aperture 342.

In some embodiments, a wall support or stabilizer 346 is also attached to the enclosure 330 (and positioned below the enclosure 330).

Figure 39:
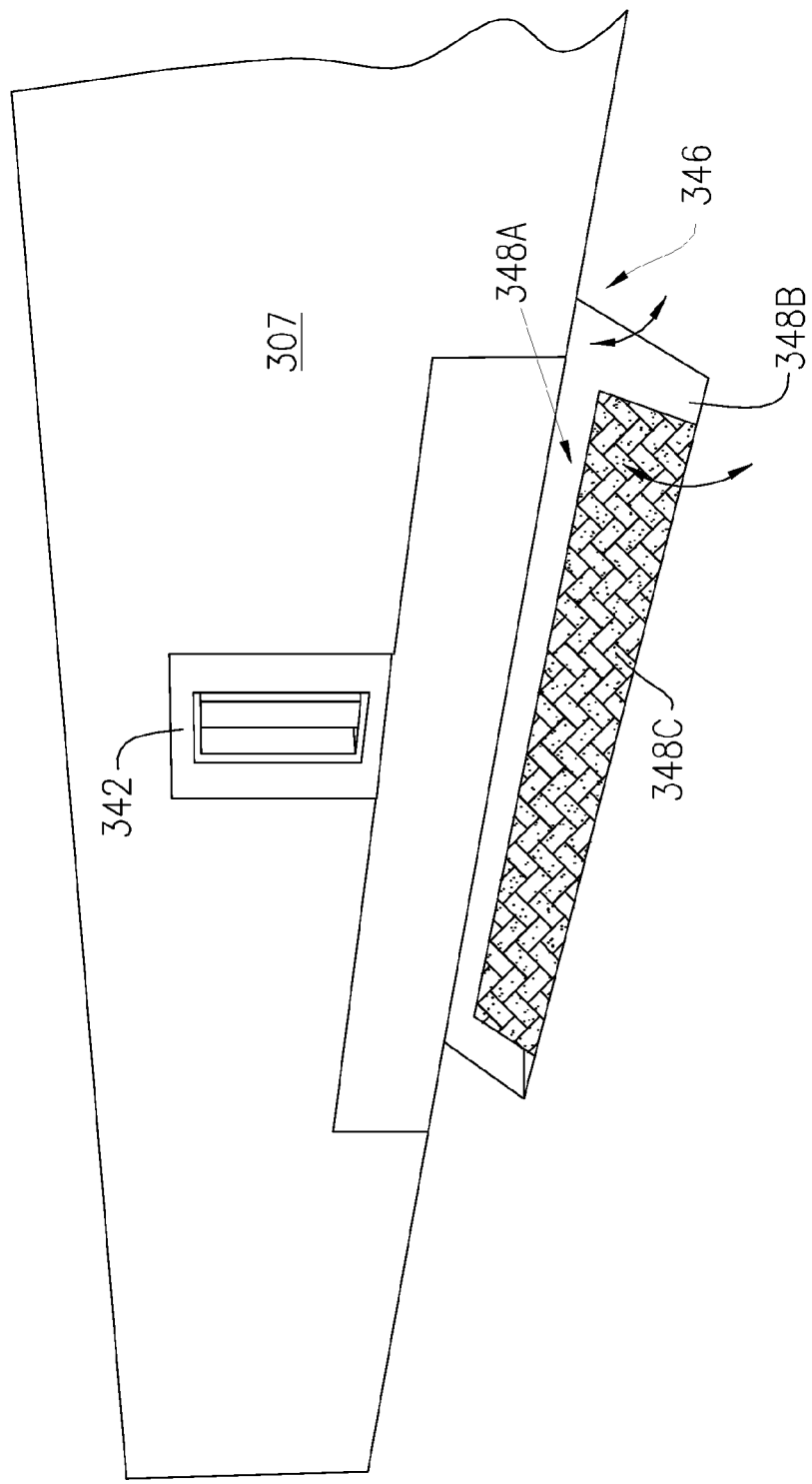
FIG. 39 is a perspective view of the second housing tray of FIG. 38, illustrating an aperture and USB connector disposed therein.

In FIG. 39, the stabilizer 346 is provided with three sections or flaps 348A-C. A primary flap 348A extends from the third housing tray 306 when the pushrod 308 is moved forward. A second flap 348B pivots from the bottom of the primary flap 348A, and a third flap 348C pivots outwardly from the top of the secondary flap 348B. Depending upon the geometry of the wall or outlet, the primary, second, or third flaps can be deployed.

As illustrated in FIG. 39, the USB connector 333 is disposed in a vertical, rather than horizontal orientation, in contrast with the embodiments of FIGS. 23-35. The aperture 342 is also oriented vertically.

In some embodiments, the apparatus 300 can comprise more than one USB connector 333. These multiple USB connectors can be deployed to couple with adjacently placed USB ports. For example, laptops (or outlets) can have USB connectors that are spaced apart from one another. The plurality of USB connectors can plug into the plurality of USB ports at the same time, in some embodiments.

Figure 40:
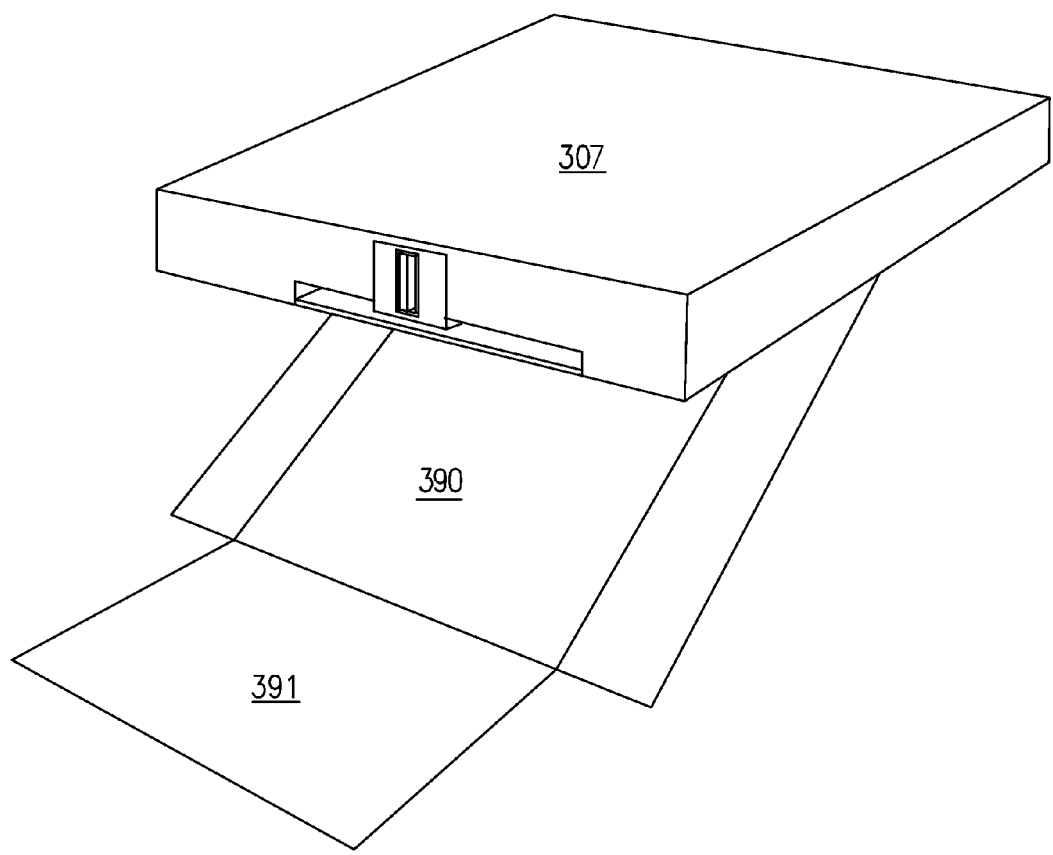
FIG. 40 is a perspective view of the second housing tray of FIG. 38 with two support members deployed.

In FIG. 40, the third housing tray 307 can comprise a pull down, pivoting stabilizer 390 that pivots from a lower portion of the third housing tray 307. In some embodiments, the pull down, pivoting stabilizer 390 comprises a secondary flap 391 that pivots away from the body of the pull down, pivoting stabilizer 390. The secondary flap 391 can contact a wall or other surface to stabilize the device when plugged into an electrical outlet.

The stabilizer 390 of FIG. 40 can alternatively be used in any housing tray embodiment described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction.

For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A device, comprising:
    a housing tray having a sidewall extending perpendicularly from the housing tray, the housing tray being configured to hold a personal electronic device, the housing tray comprising:
        an electrical connector interface that couples with a charging connector of the personal electronic device, and
        a stabilizer that pivotally extends from a lower part of the housing tray, the stabilizer contacting a wall or other support surface;
    a circuit mounted on the housing tray that charges the personal electronic device through the electrical connector interface; and
    an electrical connector for electrically coupling the circuit with a direct current (DC) power source, the electrical connector capable of being placed in either a deployed configuration where the electrical connector can couple with an electrical outlet or a stored configuration where the electrical connector cannot couple with the electrical outlet.

2. The device according to claim 1, wherein the electrical connector comprises one or more universal serial bus (USB) connectors.

3. The device according to claim 1, wherein the electrical connector comprises a micro universal serial bus (USB) connector.

4. The device according to claim 1, wherein the housing tray comprises the sidewall with an aperture, further wherein the electrical connector is disposed behind the sidewall when in the stored configuration and the electrical connector extends at least partially from the sidewall, through the aperture when in the deployed configuration.

5. The device according to claim 1, wherein the electrical connector interface can be selectively interchanged with another electrical connector interface.

6. The device according to claim 1, wherein the electrical connector is recessed within the housing tray when the electrical connector is in the stored configuration.

7. A device, comprising:
a first housing tray comprising a sidewall extending perpendicularly from the first housing tray, the first housing tray being configured to hold a personal electronic device, the first housing tray further comprising an electrical connector interface that couples with a charging connector of the personal electronic device;
a second housing tray comprising an electrical connector for electrically coupling with a direct current (DC) power source, the electrical connector capable of being placed in either a deployed configuration or a stored configuration, the second housing tray being pivotally connected to the first housing tray; and
a third housing tray that comprises a stabilizer, the stabilizer contacting a support surface, the third housing tray being pivotally connected to the second housing tray.

8. The device according to claim 7, wherein the electrical connector translates from the deployed configuration to the stored configuration using a pushrod assembly.

9. The device according to claim 7, wherein when the second housing tray and the third housing tray move away from one another the electrical connector is disposed in the deployed configuration and when the second housing tray and the third housing tray move towards one another the electrical connector is disposed in the stored configuration.

10. The device according to claim 9, wherein the electrical connector translates along a horizontal axis when moving between the deployed and stored configurations and the third housing tray pivots away from the second housing tray.

11. The device according to claim 7, wherein the third housing tray supports a weight of the personal electronic device by contacting the support surface.

12. The device according to claim 11, wherein the stabilizer rotates when extended from the third housing tray such that a mating surface of the stabilizer rests flat against the support surface.

13. The device according to claim 11, wherein the stabilizer includes an internal stabilizer flap that extends from the stabilizer.

14. The device according to claim 7, wherein the second housing tray comprises a pair of upper guides and the third housing tray comprises a pair of lower guides, each of the pair of upper guides comprising a wheel and each of the lower guides comprising a wheel, wherein a first wheel of the pair of upper guides is connected to a first wheel of the pair of lower guides with a first armature, further wherein a second wheel of the pair of upper guides is connected to a second wheel of the pair of lower guides with a second armature.

15. The device according to claim 14, further comprising a hinge coupling the second housing tray with the third housing tray.

16. The device according to claim 14, wherein the first and second wheels of the pair of lower guides are confined such that they can rotate but not translate along the pair of lower guides.

17. The device according to claim 16, wherein the first and second wheels of the pair of upper guides can rotate and translate along the pair of upper guides allowing the electrical connector to slidingly translate between the deployed and stored configurations.

18. A device, comprising:
a first housing tray comprising a sidewall extending perpendicularly from the first housing tray, the first housing tray being configured to hold a personal electronic device, the first housing tray further comprising an electrical connector interface that couples with a charging connector of the personal electronic device;
a second housing tray, the second housing tray being pivotally connected to the first housing tray, comprising:
a universal serial bus (USB) connector for electrically coupling a circuit with a USB outlet, the USB connector capable of being placed in either a deployed configuration or a stored configuration based on pivoting movement of a third housing tray relative to the second housing tray; and
the third housing tray that comprises a stabilizer, the stabilizer contacting a support surface to support a weight of the personal electronic device, the third housing tray being pivotally connected to the second housing tray.

* * * * *